United States Patent
Sato

(10) Patent No.: US 9,578,191 B2
(45) Date of Patent: Feb. 21, 2017

(54) IMAGE FORMING APPARATUS, IMAGE FORMING SYSTEM AND COMPUTER READABLE RECORDING MEDIUM CONFIGURED TO RECEIVE A BEACON SIGNAL ASSOCIATED WITH A SCREEN DEFINITION INFORMATION

(71) Applicant: BROTHER KOGYO KABUSHIKI KAISHA, Nagoya-shi, Aichi-ken (JP)

(72) Inventor: Hirokazu Sato, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/980,049

(22) Filed: Dec. 28, 2015

(65) Prior Publication Data

US 2016/0212283 A1 Jul. 21, 2016

(30) Foreign Application Priority Data

Dec. 25, 2014 (JP) ................. 2014-263160

(51) Int. Cl.
*H04N 1/00* (2006.01)
*H04N 1/32* (2006.01)

(52) U.S. Cl.
CPC ........ *H04N 1/00315* (2013.01); *H04N 1/0049* (2013.01); *H04N 1/00411* (2013.01); *H04N 1/00501* (2013.01); *H04N 1/00954* (2013.01); *H04N 1/32101* (2013.01); *H04N 1/32507* (2013.01); *H04N 2201/006* (2013.01); *H04N 2201/0055* (2013.01); *H04N 2201/0094* (2013.01)

(58) Field of Classification Search
USPC ........ 345/619, 211, 212, 213, 214; 358/1.2, 358/1.9, 1.15
See application file for complete search history.

(56) References Cited

U.S. PATENT DOCUMENTS

2004/0048621 A1  3/2004  Takahashi et al.
2011/0083083 A1* 4/2011  Kurumai ........... G06F 17/30905
                                                    715/744

(Continued)

FOREIGN PATENT DOCUMENTS

JP  2004-38228 A  2/2004
JP  2008-281361 A  11/2008

*Primary Examiner* — Marcellus Augustin
(74) *Attorney, Agent, or Firm* — Scully, Scott, Murphy & Presser, PC

(57) ABSTRACT

An image forming apparatus includes: an image forming device forming an image; an input device; a beacon receiver; a storage storing definition information for defining a common standby screen, an individual standby screen and a transition destination screen; a display configured to display screens defined by the definition information; and a controller. The controller executes: display control processing of displaying the standby screen and the standby screen on the display when the input device is not operated for a time period; storage control processing of, when receiving the beacon signal, storing beacon information; reception processing of receiving a user's operation of selecting the screen transition object; screen transition processing of, when the operation is received, displaying the transition destination screen; and switching processing of displaying the individual standby screen associated with target identification information only when the standby screen is displayed.

14 Claims, 13 Drawing Sheets

(56) References Cited

U.S. PATENT DOCUMENTS

2011/0187738 A1* 8/2011 Yajima .................. G06F 3/14
                                                345/619
2014/0146336 A1* 5/2014 Yagi ................ H04N 1/00904
                                                358/1.13

* cited by examiner

FIG.3

| TIMING INFORMATION | TERMINAL ID | INTENSITY INFORMATION |
|---|---|---|
| 09:43:16.173 | 001 | 2.4 |
| 09:43:16.273 | 001 | 2.8 |
| ⋮ | ⋮ | ⋮ |
| 10:04:23.951 | 003 | 3.3 |
| 10:04:24.736 | 001 | 1.8 |
| 10:04:24.782 | 002 | 2.9 |
| 10:04:24.836 | 001 | 4.0 |
| 10:04:24.882 | 002 | 3.2 |
| 10:04:25.084 | 003 | 1.6 |

MONITORING TIME PERIOD

FIG.4

| TERMINAL ID | DEFINITION INFORMATION |
|---|---|
|  | COMMON STANDBY SCREEN DEFINITION INFORMATION |
|  | FAX TRANSMISSION SCREEN DEFINITION INFORMATION |
|  | ... |
| 001 | FIRST STANDBY SCREEN DEFINITION INFORMATION |
| 002 | SECOND STANDBY SCREEN DEFINITION INFORMATION |
| 003 | THIRD STANDBY SCREEN DEFINITION INFORMATION |

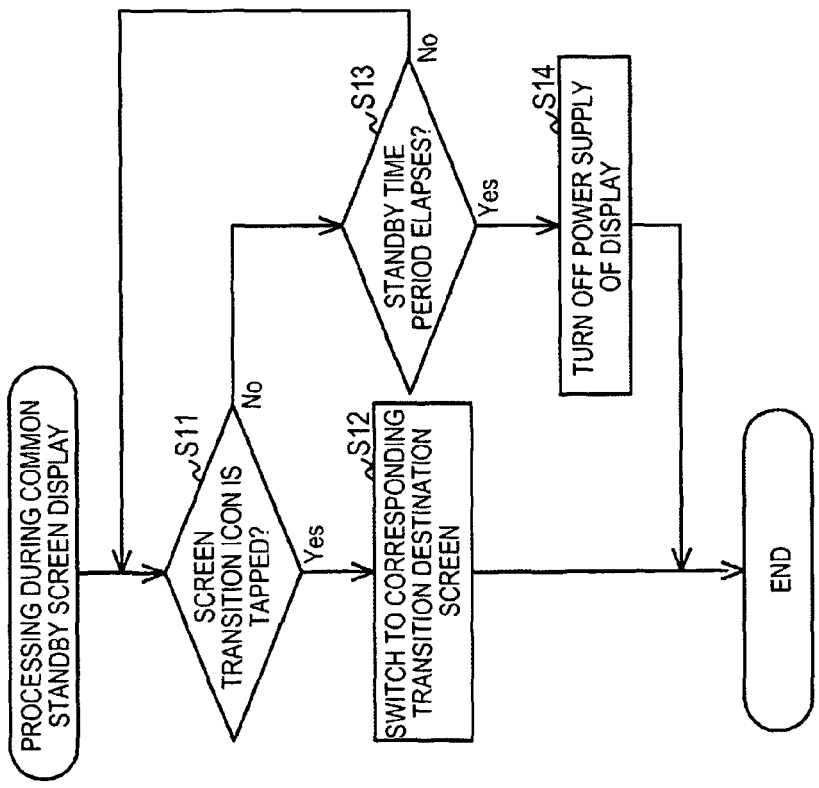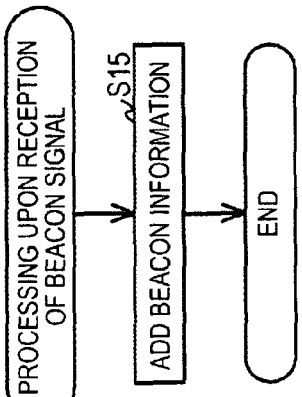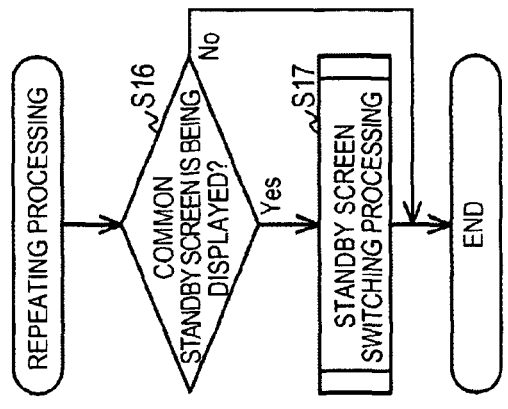

| TERMINAL ID | DEFINITION INFORMATION |
|---|---|
| | STANDBY SCREEN DEFINITION INFORMATION |
| | COMMON FAX TRANSMISSION SCREEN DEFINITION INFORMATION |
| | ⋮ |
| 001 | FIRST FAX TRANSMISSION SCREEN DEFINITION INFORMATION |
| 002 | SECOND FAX TRANSMISSION SCREEN DEFINITION INFORMATION |
| 003 | THIRD FAX TRANSMISSION SCREEN DEFINITION INFORMATION |

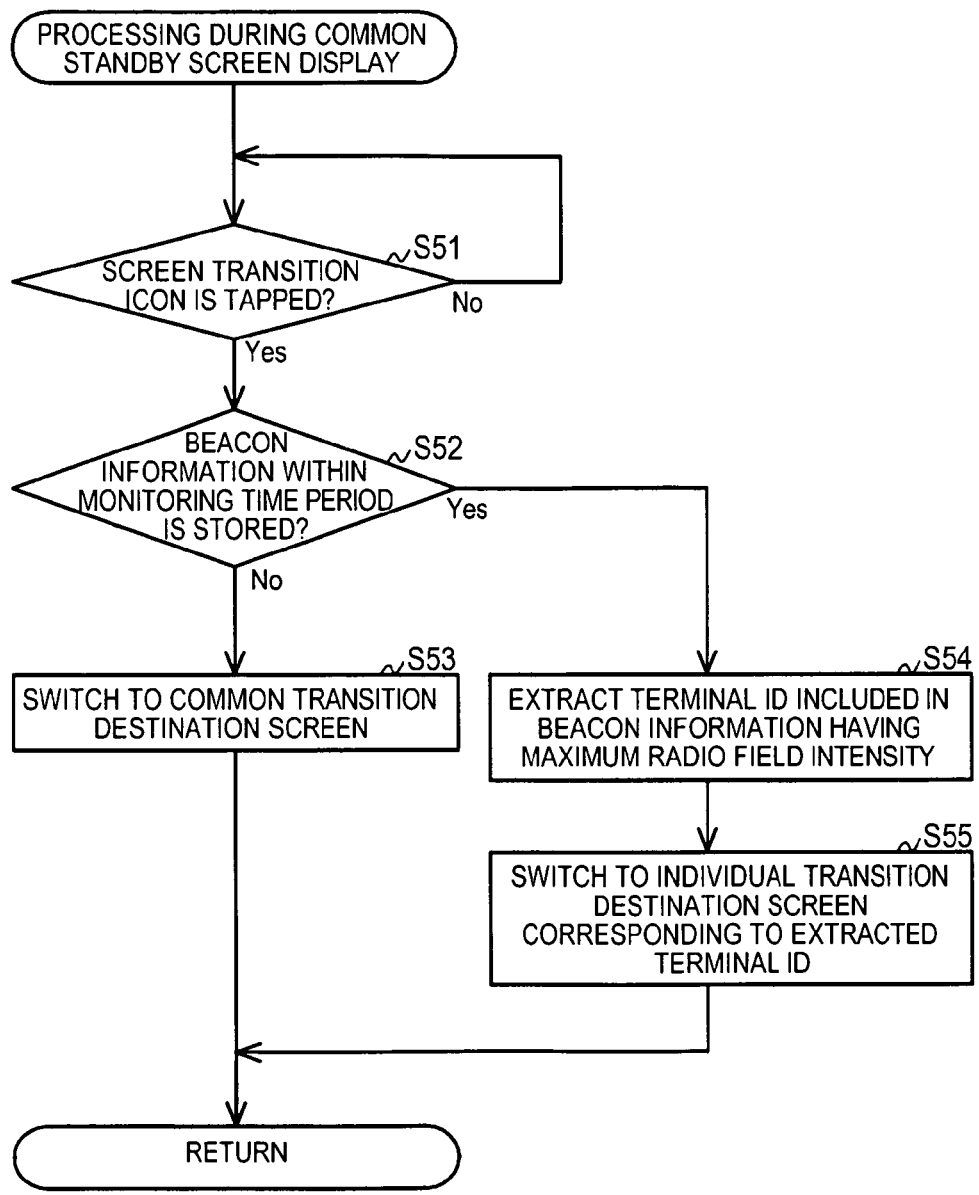

IMAGE FORMING APPARATUS, IMAGE FORMING SYSTEM AND COMPUTER READABLE RECORDING MEDIUM CONFIGURED TO RECEIVE A BEACON SIGNAL ASSOCIATED WITH A SCREEN DEFINITION INFORMATION

CROSS REFERENCE TO RELATED APPLICATION

This application is based upon and claims the benefit of priority of Japanese Patent Application No. 2014-263160 filed on Dec. 25, 2014, the contents of which are incorporated herein by reference in its entirety.

BACKGROUND

The disclosure relates to an image forming apparatus in which a screen to be displayed on a display is changed by a user's operation.

In the related art, an image forming apparatus configured to receive an instruction from a user through a user interface such as a display and an input device has been known. For example, such a technology is known, which switches a using environment of an electronic device to an environment for a user when the user carrying an identification information transmitting apparatus comes close to the electronic device.

SUMMARY

However, in case that the electronic device having the above configuration is commonly used among a plurality of users, when a second user passes a vicinity of the electronic device that is being operated by a first user, it is not favorable if the using environment of the electronic device is switched to an environment for the second user, because the first user's operation is disturbed.

It is therefore an object of the disclosure to provide an image forming apparatus capable of displaying a screen customized for a close user without disturbing other user's operation.

An aspect of the present disclosure provides the following arrangements:

An image forming apparatus includes: an image forming device configured to form an image; an input device; a beacon receiver configured to receive a beacon signal transmitted from a portable terminal with a radio wave, the beacon signal including identification information for identifying the portable terminal; a storage configured to store definition information for defining a common standby screen, an individual standby screen and a transition destination screen, the common standby screen including a screen transition object for instructing transition of a screen and being common to all users, the individual standby screen including a screen transition object for instructing transition of a screen and being associated with the identification information included in the beacon signal by the portable terminal, the individual standby screen being customized for a user of the portable terminal, and the transition destination screen being associated with the screen transition object and being configured to input operation information for instructing the image forming device to perform an operation; a display configured to display screens defined by the definition information; and a controller. The controller is configured to execute: display control processing of displaying one of the common standby screen and the individual standby screen on the display when the input device is not operated for a first time period after the transition destination screen is displayed on the display; storage control processing of, when the beacon receiver receives the beacon signal, storing beacon information in the storage, the beacon information including the identification information included in the beacon signal and timing information indicative of a receiving timing at which the beacon signal is received; first reception processing of receiving a first user's operation of selecting the screen transition object included in the displayed one of the common standby screen and the individual standby screen through the input device; screen transition processing of, when the first user's operation is received through the input device, changing a screen displayed on the display from the one of the common standby screen and the individual standby screen, which is displayed on the display in the display control processing, to, the transition destination screen associated with the screen transition object; and switching processing of changing the screen displayed on the display from the one of the common standby screen and the individual standby screen, which is displayed on the display in the display control processing, to the individual standby screen associated with target identification information only when the one of the common standby screen and the individual standby screen is displayed, the target identification information corresponding to the identification information included in the beacon information of which receiving timing is within a past monitoring time period from a present time to a predetermined past time.

An image forming apparatus includes: an image forming device configured to form an image; an input device; a beacon receiver configured to receive a beacon signal transmitted from a portable terminal with a radio wave, the beacon signal including identification information for identifying the portable terminal; a storage configured to store definition information for defining a standby screen, a common transition destination screen and an individual transition destination screen, the standby screen including a screen transition object for instructing transition of a screen, the common transition destination screen being associated with the screen transition object, being configured to input operation information for instructing the image forming device to perform an operation and being common to all users, and the individual transition destination screen being associated with the screen transition object, being configured to input operation information for instructing the image forming device to perform the operation, being associated with the identification information included in the beacon signal received from the portable terminal and being customized for a user of the portable terminal; a display configured to display screens defined by the definition information, and a controller. The controller is configured to execute: display control processing of displaying the standby screen on the display when a non-operation time period of the input device reaches a first time period after one of the common transition destination screen and the individual transition destination screen is displayed on the display; storage control processing of, when the beacon receiver receives the beacon signal, storing beacon information, the beacon information including the identification information included in the beacon signal and timing information indicative of a receiving timing at which the beacon signal is received, in the storage; first reception processing of receiving a first user's operation of selecting the screen transition object included in the standby screen through the input device; and screen transition processing of, when the first user's operation is received through the input device, displaying, on the display, the common transition destination screen on the display in a case in which the beacon information of which the receiving timing is within a past monitoring time period from a present time to a predetermined past time is not stored in the storage, and displaying, on the display, the individual transition destination screen associated with the identification information included in the beacon information in a case in which the beacon information of which the receiving timing is within the monitoring time period is stored in the storage.

An image forming system includes a portable terminal and an image forming apparatus. The portable terminal includes: a beacon transmitting unit configured to transmit a beacon signal with a radio wave, the beacon signal including identification information for identifying the portable terminal, and a first controller configured to execute transmission processing for causing the beacon transmitting unit to repeatedly transmit the beacon signal at a predetermined time interval. The image forming apparatus includes: an image forming device configured to form an image; an input device; a beacon receiver configured to receive a beacon signal transmitted from a portable terminal with a radio wave, the beacon signal including identification information for identifying the portable terminal; a storage configured to store definition information for defining a common standby screen, an individual standby screen and a transition destination screen, the common standby screen including a screen transition object for instructing transition of a screen and being common to all users, the individual standby screen including a screen transition object for instructing transition of a screen and being associated with the identification information included in the beacon signal by the portable terminal, the individual standby screen being customized for a user of the portable terminal, and the transition destination screen being associated with the screen transition object and being configured to input operation information for instructing the image forming device to perform an operation; a display configured to display screens defined by the definition information; and a second controller. The controller is configured to execute: display control processing of displaying one of the common standby screen and the individual standby screen on the display when the input device is not operated for a first time period after the transition destination screen is displayed on the display; storage control processing of, when the beacon receiver receives the beacon signal, storing beacon information in the storage, the beacon information including the identification information included in the beacon signal and timing information indicative of a receiving timing at which the beacon signal is received; first reception processing of receiving a first user's operation of selecting the screen transition object included in the displayed one of the common standby screen and the individual standby screen through the input device; screen transition processing of, when the first user's operation is received through the input device, changing the screen displayed on the display from the one of the common standby screen and the individual standby screen, which is displayed on the display in the display control processing, to the transition destination screen associated with the screen transition object; and switching processing of changing the screen displayed on the display from the one of the common standby screen and the individual standby screen, which is displayed on the display in the display control processing, to the individual standby screen associated with target identification information only when the one of the common standby screen and the individual standby screen is displayed, the target identification information corresponding to the identification information included in the beacon information of which receiving timing is within a past monitoring time period from a present time to a predetermined past time.

A non-transitory computer readable recording medium stores a computer program configured to be executed by a computer comprising: an image forming device configured to form an image; an input device; a beacon receiver configured to receive a beacon signal transmitted from a portable terminal with a radio wave, the beacon signal including identification information for identifying the portable terminal; a storage configured to store definition information for defining a common standby screen, an individual standby screen and a transition destination screen, the common standby screen including a screen transition object for instructing transition of a screen and being common to all users, the individual standby screen including a screen transition object for instructing transition of a screen and being associated with the identification information included in the beacon signal by the portable terminal, the individual standby screen being customized for a user of the portable terminal, and the transition destination screen being associated with the screen transition object and being configured to input operation information for instructing the image forming device to perform an operation; a display configured to display screens defined by the definition information; and a second controller. The computer program when executed by the computer causes the computer to execute: display control processing of displaying one of the common standby screen and the individual standby screen on the display when the input device is not operated for a first time period after the transition destination screen is displayed on the display; storage control processing of, when the beacon receiver receives the beacon signal, storing beacon information in the storage, the beacon information including the identification information included in the beacon signal and timing information indicative of a receiving timing at which the beacon signal is received; first reception processing of receiving a first user's operation of selecting the screen transition object included in the displayed one of the common standby screen and the individual standby screen through the input device; screen transition processing of, when the first user's operation is received through the input device, changing a screen displayed on the display from the one of the common standby screen and the individual standby screen, which is displayed on the display in the display control processing, to the transition destination screen associated with the screen transition object; and switching processing of changing the screen displayed on the display from the one of the common standby screen and the individual standby screen, which is displayed on the display in the display control processing, to the individual standby screen associated with target identification information only when the one of the common standby screen and the individual standby screen is displayed, the target identification information corresponding to the identification information included in the beacon information of which receiving timing is within a past monitoring time period from a present time to a predetermined past time.

BRIEF DESCRIPTION OF DRAWINGS

FIG. 3 depicts an example of beacon information stored in a data storage area 32B.

FIG. 4 depicts an example of definition information stored in the data storage area 32B.

FIGS. 5A, 5B and 5C is a flowchart depicting operations of the complex machine 10 according to the illustrative embodiment, in which FIG. 5A depicts processing during a common standby screen display, FIG. 5B depicts processing upon reception of a beacon signal, and FIG. 5C depicts repeating processing.

FIGS. 8A and 8B depict a display example of a display 23, in which FIG. 8A depicts a common standby screen and FIG. 8B depicts a FAX transmission screen.

FIGS. 9A and 9B depict a display example of the display 23, in which FIG. 9A depicts an individual standby screen and FIG. 9B depicts a destination screen.

FIGS. 10A and 10B are a flowchart depicting operations of the complex machine 10 according to a first modified embodiment, in which FIG. 10A depicts the repeating processing and FIG. 10B depicts the processing during the standby screen display.

FIGS. 11A and 11B depict a display example of the display 23, in which FIG. 11A depicts the common standby screen including a switching icon 92, and FIG. 11B depicts the common standby screen including switching icons 92, 93.

FIG. 13 is a flowchart depicting the processing during the common standby screen display according to a second modified embodiment.

DESCRIPTION OF ILLUSTRATIVE EMBODIMENTS

Hereinafter, illustrative embodiments of the disclosure will be described with reference to the drawings. In the meantime, the illustrative embodiments that will be described later are just examples of the disclosure, and can be appropriately changed without departing from the gist of the disclosure.

Figure 1:
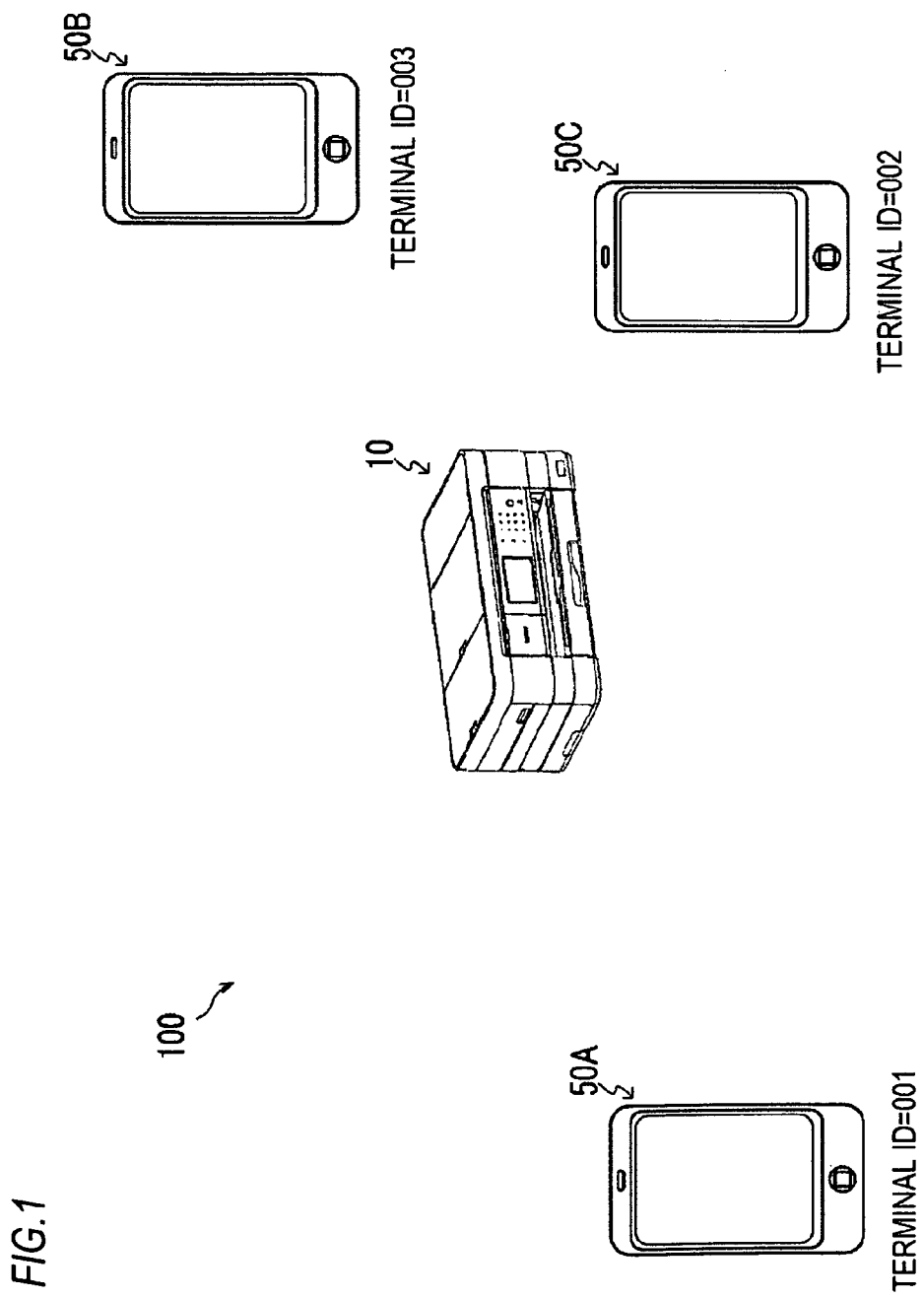
FIG. 1 is a schematic diagram of an image forming system 100 according to an illustrative embodiment.

FIG. 1 is a schematic diagram of an image forming system 100 according to the illustrative embodiment. The image forming system 100 shown in FIG. 1 includes a complex machine 10 and a plurality of portable terminals 50A, 50B, 50C. In the meantime, configurations of the portable terminals 50A, 50B, 50C necessary to implement operations of the illustrative embodiment are common, as described later with reference to FIG. 2. In the below, the portable terminals 50A, 50B, 50C may also be collectively referred to as 'portable terminal 50.'

[Complex Machine 10]

Figure 2A:
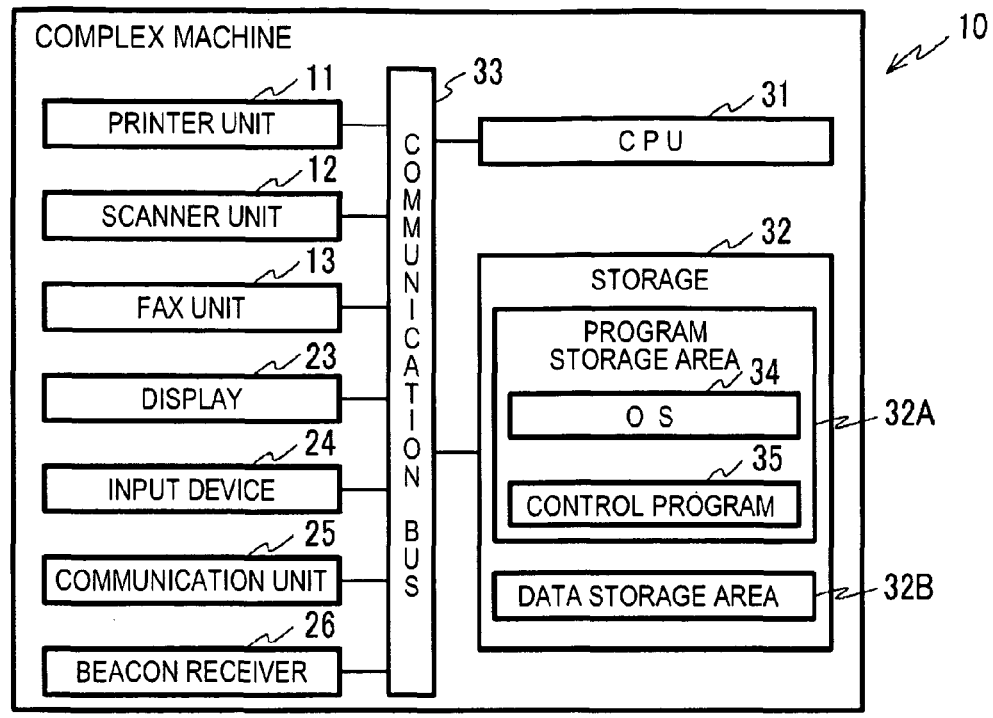
FIG. 2A is a functional block diagram of a complex machine 10.
Figure 2B:
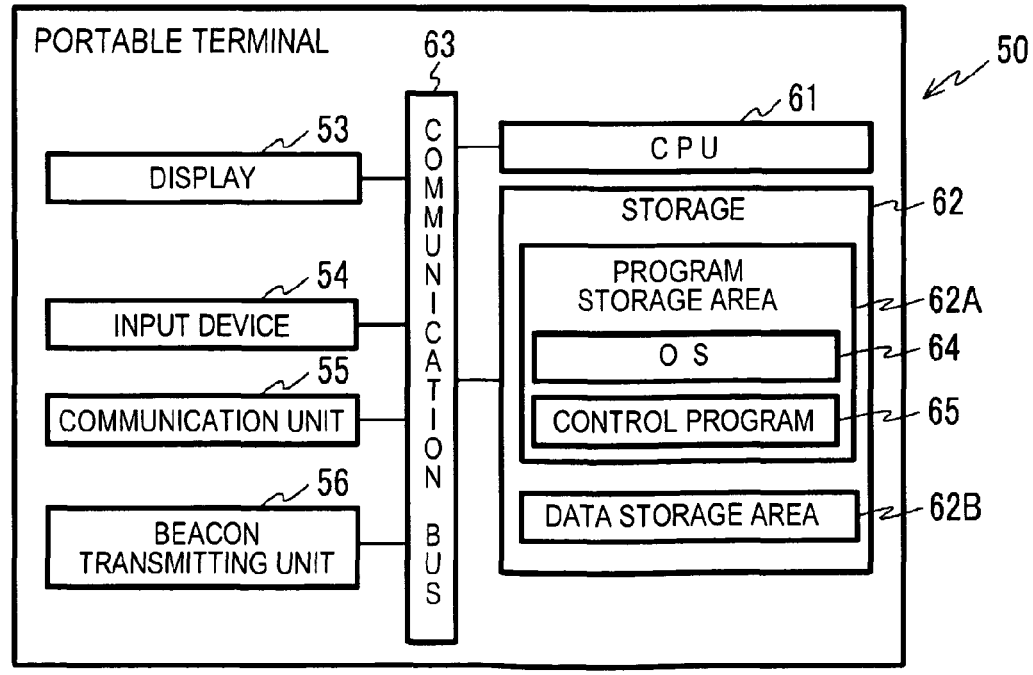
FIG. 2B is a functional block diagram of a portable terminal 50.
Figure 6:
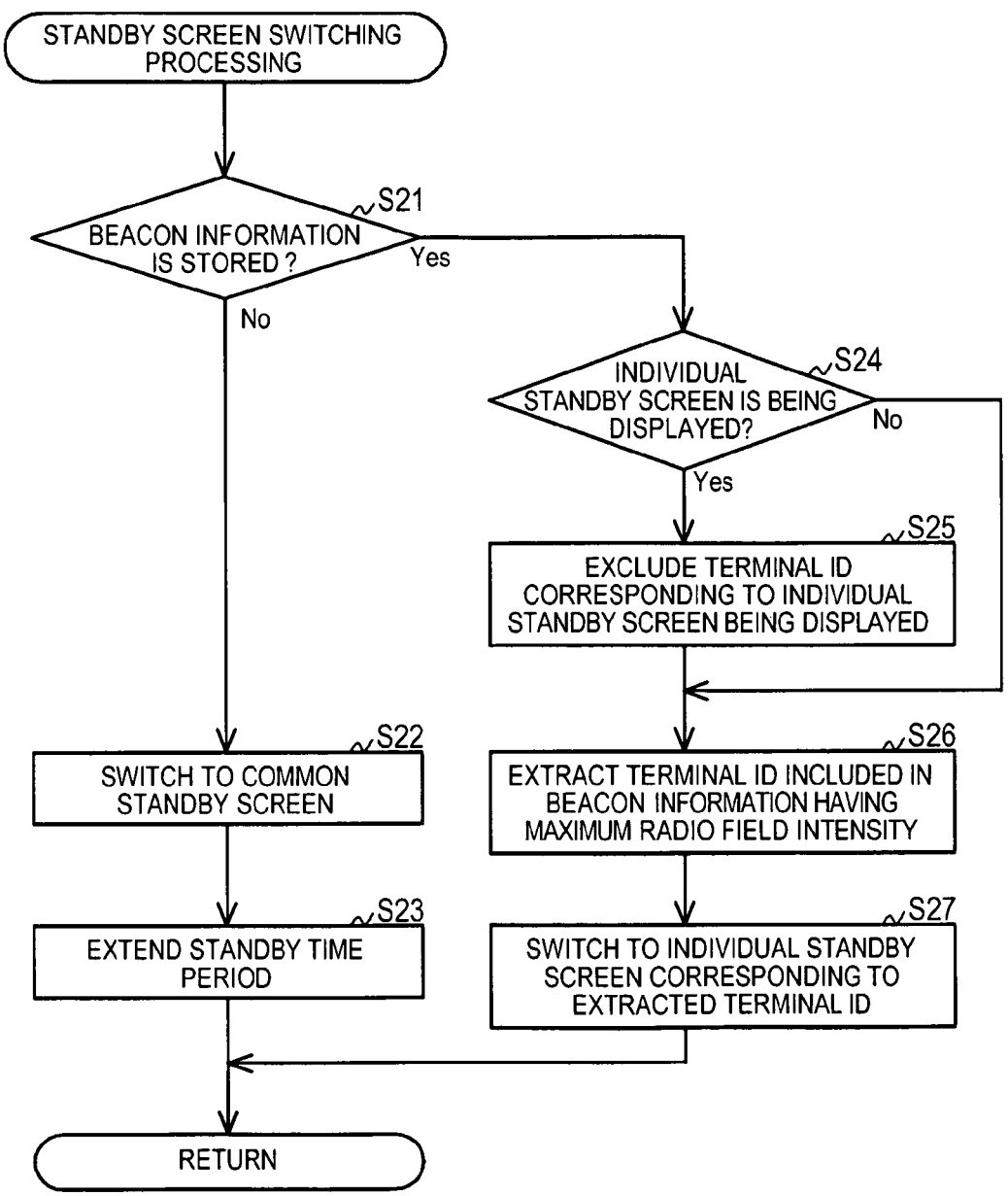
FIG. 6 is a flowchart of standby screen switching processing.

As shown in FIG. 2, the complex machine 10 mainly has a printer unit 11, a scanner unit 12, a FAX unit 13, a display 23, an input device 24, a communication unit 25, a beacon receiver 26, a CPU 31, a storage 32, and a communication bus 33. The respective constitutional elements configuring the complex machine 10 are connected each other through the communication bus 33. The complex machine 10 is an example of the image forming apparatus.

[Printer Unit 11, Scanner Unit 12, FAX Unit 13]

The printer unit 11 is configured to execute recording processing of recording an image, which is represented by image data, onto a recording sheet that is an example of the sheet. Although a recording method of the printer unit 11 is not particularly limited, a well-known method such as an inkjet method and an electrophotographic method may be adopted. The scanner unit 12 is configured to execute scan processing of reading an image recorded on a recording sheet to generate image data. The FAX unit 13 is configured to execute FAX processing of transmitting and receiving FAX unconformity to a FAX protocol. The printer unit 11, the scanner unit 12 and the FAX unit 13 are examples of the image forming device configured to form an image.

[Display 23]

The display 23 has a display screen for displaying a variety of information. Although a specific configuration of the display 23 is not particularly limited, an LCD (abbreviation of Liquid Crystal Display), an OELD (abbreviation of Organic Electro-Luminescence Display) and the like may be adopted, for example.

[Input Device 24]

The input device 24 is configured to receive a user's operation of selecting an object displayed on the display screen of the display 23. Specifically, the input device 24 has push buttons, for example, and is configured to output a variety of operation signals associated with the pressed push buttons to the CPU 31. The input device 24 may have a film-shaped touch sensor superimposed on the display screen of the display 23. That is, the display 23 may be configured as a touch panel display.

In the meantime, the term 'object' indicates an image that can be selected by a user's operation on the input device 24. For example, the object is a character string displayed on the display 23. When a direction key of the input device 24 is pressed, one of the objects may be highlighted, and when an enter button of the input device 24 is pressed, the highlighted object may be selected. In another example, when the input device 24 is configured as a touch panel, the object may be an icon, a button, a link and the like displayed on the display 23, and the object displayed at a touched position may be selected.

The input device 24 implemented as a touch panel is configured to receive a user's operation of touching the display screen of the display 23. The input device 24 is configured to output position information indicating a position on the display screen touched by the user. The position information can be expressed by coordinates (x, y) on an x-y plane in which a left and upper end of the display screen is defined as an origin, a right direction is defined as a positive direction of an x axis and a down direction is defined as a positive direction of a y axis. As the touch sensor, a well-known sensor such as an electrostatic capacitance type, a resistance film type and the like may be adopted.

In the specification, the term 'touch' includes a variety of operations of contacting an input medium to the display screen. That is, a tap operation of separating a touched input medium from the display screen within a predetermined time period, a long touch operation of immobilizing a touched input medium on the display screen, a slide operation of sliding a touched input medium on the display screen, a flick operation where an acceleration of an input medium sliding on the display screen is equal to or greater than a threshold, a pinch-in operation of sliding two input media touched at different positions on the display screen in a direction of bringing the same into close to each other, a pinch-out operation of sliding two input media touched at different positions on the display screen in a direction of separating the same from each other, and the like are examples of the touch.

An operation of bringing an input medium close to a position spaced from the display screen by an extremely slight gap even though the input medium is not contacted to the display screen may be included to the concept of the 'touch'. The input medium may be a user's finger, a touch pen and the like.

[Communication Unit 25]

The communication unit 25 is an interface for performing communication with an external apparatus through a communication network. That is, the complex machine 10 is configured to output a variety of information to the portable terminal 50 through the communication unit 25 and to receive a variety of data or information from the portable terminal 50 through the communication unit 25. Although the specific communication protocol of the communication unit 25 is not particularly limited, Wi-Fi (registered trademark of the Wi-Fi Alliance) may be adopted, for example.

[Beacon Receiver 26]

The beacon receiver 26 is configured to receive a beacon signal transmitted from the portable terminal 50. The beacon signal is based on any one of NFC (abbreviation of Near Field Communication), Bluetooth (registered trademark of Bluetooth SIG, Inc.), Bluetooth Low Energy, Bluetooth Smart and iBeacon (registered trademark of Apple Inc.), for example.

[CPU 31]

The CPU (abbreviation of Central Processing Unit) 31 is configured to control the entire operations of the complex machine 10. The CPU 31 is configured to acquire and execute a variety of programs (which will be described later) from the storage 32, based on the variety of information output from the input device 24 and the variety of information acquired from the external apparatus through the communication unit 25. That is, the CPU 31 and the storage 32 configure an example of the controller.

[Storage 32]

The storage 32 has a program storage area 32A and a data storage area 32B. In the program storage area 32A, an OS (abbreviation of Operating System) 34 and a control program 35 are stored. In the meantime, the control program 35 may be a single program or a combination of a plurality of programs. In the data storage area 32B, data or information necessary to execute the control program 35 is stored.

In the data storage area 32B, beacon information about the beacon signal received at the beacon receiver 26 is stored, as shown in FIG. 3, for example. When the beacon signal is received through the beacon receiver 26, the control program 35 newly adds the beacon information of the beacon signal to the data storage area 32B.

In the meantime, the beacon information of the illustrative embodiment is stored in a volatile memory such as a RAM. That is, when the power feeding to the complex machine 10 is stopped, the beacon information stored in the data storage area 32B is erased. Alternatively, when a predetermined threshold time period elapses after the beacon signal is received, the control program 35 may delete the corresponding beacon information from the data storage area 32B.

As shown in FIG. 3, the beacon information includes timing information, which indicates a receiving timing at which the beacon signal is received, a terminal ID included in the beacon signal, and intensity information, which indicates a radio field intensity of the received beacon signal. In the meantime, the plurality of beacon information shown in FIG. 3 is aligned from top down in order of the older receiving timings. That is, the lowest beacon information in FIG. 3 is the beacon information of which the receiving timing is latest.

The terminal ID is an example of the identification information for identifying the portable terminal 50. Although a specific example of the terminal ID is not particularly limited, the terminal ID may be a MAC (abbreviation of Media Access Control) address allotted to the communication unit 25 of the portable terminal 50 or may be arbitrarily set by the user, for example. In the illustrative embodiment, the terminal ID of the portable terminal 50A is "001", the terminal ID of the portable terminal 50B is "002", and the terminal ID of the portable terminal 50C is "003".

The timing information may be any information capable of specifying the past receiving timing of the beacon signal, the past receiving timing being specified from a present time to the past. The timing information shown in FIG. 3 is expressed by a combination of hour, minute, second and millisecond at which the corresponding beacon signal was received. The timing information may include year, month and date at which the corresponding beacon signal was received. A format of the timing information to be stored in the data storage area 32B is not limited to the above example. For example, a time stamp format or a count value of a clock counter (not shown) may be used.

As shown in FIG. 4, in the data storage area 32B, definition information, which defines respective screens shown in FIGS. 8, 9 and 11, is stored. In the example of FIG. 4, common standby screen definition information, which defines a common standby screen, FAX transmission screen definition information, which defines a FAX transmission screen, and first standby screen definition information to third standby screen definition information, which define individual standby screens, are stored in the data storage area 32B. In the meantime, the common standby screen and the individual standby screen may also be collectively referred to as 'standby screen'. Although not shown, definition information, which defines the other screens capable of being displayed on the display 23, is also stored in the data storage area 32B.

The definition information defines a layout of messages and icons included in a corresponding screen, processing associated with an icon, and the like. The definition information may be described by an XML (abbreviation of Extensible Markup Language), for example. The definition information may be stored in advance in the data storage area 32B upon shipment of the complex machine 10, may be acquired from a server apparatus (not shown) through the communication unit 25 or may be arbitrarily prepared or edited by the user.

As shown in FIG. 4, the common standby screen definition information and the FAX transmission screen definition information are not associated with the terminal ID. That is, the screens, which are to be expressed by the common standby screen definition information and the FAX transmission screen definition information, are screens that are to be commonly used by all users. The screen, which is to be expressed by the definition information not associated with the terminal ID, is displayed on the display 23 even when the portable terminal 50 is not close to the complex machine 10.

On the other hand, the first to third standby screen definition information is associated with the terminal IDs. In the example of FIG. 4, the individual standby screen defined by the first standby screen definition information is a screen customized for a user of the portable terminal 50A identified by the terminal ID "001". The second standby screen definition information and the third standby screen definition information are also the same. The screen, which is to be represented by the definition information associated with the terminal ID, is in principle displayed on the display 23 when the portable terminal 50 identified by the terminal ID comes close to the complex machine 10. At this time, when the user of the portable terminal 50 identified by the terminal ID logs in the complex machine 10, or when an administrator of the complex machine 10 logs in and instructs a display of a standby screen for a specific user, the standby screen may also be displayed.

In the meantime, 'data' and 'information' in the specification have a common feature that 'data' and 'information' are bits or bit string, which can be handled by a computer. The term 'data' indicates that a semantic content represented by each bit can be handled by a computer without considering the semantic content. In contrast, the term 'information' indicates that an operation of the computer is branched by a semantic content represented by each bit. Further, the term 'instruction' indicates a control signal for urging an apparatus of a transmission destination to perform a next operation, and may include the information or may have a property as the information.

'Data' and 'information' are handled as the same data and information even though the formats (for example, a text format, a binary format, a flag format and the like) are changed for each computer, inasmuch as they are recognized as the same semantic content. For example, the information representing 'two' may be kept as information of a text format "0x32", which is the ASCII code, in one computer and may be kept as information of a binary format "10", which is the binary representation, in another computer.

However, the distinction of 'data' and 'information' is not strict, and an exceptional handling is also allowed. For example, the data may be temporarily handled as the information, and the information may be temporarily handled as the data. One that is handled as the data in an apparatus may be handed as the information in another apparatus. Further, the information may be extracted from the data, and the data may be extracted from the information.

The storage 32 is configured by a RAM (abbreviation of Random Access Memory), a ROM (abbreviation of Read Only Memory), an EEPROM (abbreviation of Electrically Erasable Programmable Read-Only Memory), an HDD (abbreviation of Hard Disk Drive), a buffer provided for the CPU 31 or a combination thereof.

In the meantime, the storage 32 may be a computer-readable storage medium. The computer-readable storage medium is a non-transitory medium. The non-transitory medium includes a recording medium such as a CD-ROM and a DVD-ROM, too. The non-transitory medium is a tangible medium. In the meantime, an electric signal for carrying a program to be downloaded from a server and the like on the Internet is a computer-readable signal medium, which is one kind of the computer-readable medium, but is not included in the non-transitory computer-readable storage medium.

The program stored in the program storage area 32A is configured to be executed by the CPU 31. However, in the specification, the operations of each program may be described while omitting the CPU 31. That is, in below descriptions, the description 'program A is configured to execute processing A' may indicate that 'CPU 31 is configured to execute processing A described in the program A'. This is also the same for the portable terminal 50, which will be described later.

The OS 34 is a basic program for providing an API (abbreviation of Application Programming Interface) configured to control the printer unit 11, the scanner unit 12, the FAX unit 13, the display 23, the input device 24, the communication unit 25, the beacon receiver 26 and the like, which are the hardware configuring the complex machine 10. That is, each program described above is configured to call the API provided by the OS 34, thereby controlling the respective hardware. However, in the specification, the operations of each program may be described while omitting the OS 34. That is, in below descriptions, the description 'program B is configured to control hardware C' may indicate that 'program B is configured to control hardware C through the API of the OS 34'. This is also the same for the portable terminal 50, which will be described later.

[Portable Terminal 50]

As shown in FIG. 2, the portable terminal 50 mainly has a display 53, an input device 54, a communication unit 55, a beacon transmitting unit 56, a CPU 61, a storage 62 and a communication bus 63. Since the display 53, the input device 54, the communication unit 55, the CPU 61, the storage 62 and the communication bus 63, which are included in the portable terminal 50, are common to the display 23, the input device 24, the communication unit 25, the CPU 31, the storage 32 and the communication bus 33, which are included in the complex machine 10, the overlapping descriptions are omitted. The CPU 61 and the storage 62 configure an example of the controller. Although a specific example of the portable terminal 50 is not particularly limited, a smart phone, a portable phone and a tablet terminal may be exemplified.

In the program storage area 62A of the storage 62, an OS 64 and a control program 65 are stored. The beacon transmitting unit 56 is configured to transmit a beacon signal of a radio wave having a preset output. The control program 65 is configured to enable the beacon transmitting unit 56 to repeatedly transmit the beacon signal at a predetermined time interval. The control program 65 adds the terminal ID of the portable terminal 50 to the beacon signal that is to be transmitted by the beacon transmitting unit 56.

[Operations of Image Forming System 100]

Display control processing of the illustrative embodiment is described with reference to FIGS. 5 to 9. The display control processing is processing of switching a screen, which is to be displayed on the display 23 of the complex machine 10, on the basis of the beacon signal to be transmitted from the portable terminal 50.

In the meantime, the complex machine 10 of the illustrative embodiment can be switched between a login state and a non-login state. The non-login state is a state where only an operation, which is permitted to all users, can be received through the input device 24. On the other hand, the login state is a state where an operation, which is specially permitted to a logged-in user, can be received through the input device 24, in addition to the operation permitted at the non-login state. The operation, which is specially permitted at the login state, includes an operation of adding, editing and deleting a destination in a telephone directory for a logged-in user, an operation of initializing the settings of the complex machine 10, an operation of making a setting about a security, and the like, for example. The setting about a security includes a switching of validity and invalidity of a so-called secure printing, which requires an input of a password upon recording processing, an input of personal information of a logged-in user, and the like.

When a login screen is displayed on the display 23 and a combination of right login ID and password is received through the input device 24, for example, the complex machine 10 enters the login state. On the other hand, when a user's operation of tapping a position of a [log-out] icon in a log-out screen is received through the input device 24, for example, the complex machine 10 enters a log-out state. In the below descriptions, it is assumed that the processing is performed at the non-login state, except that the login state is explicitly indicated.

Figure 8A:
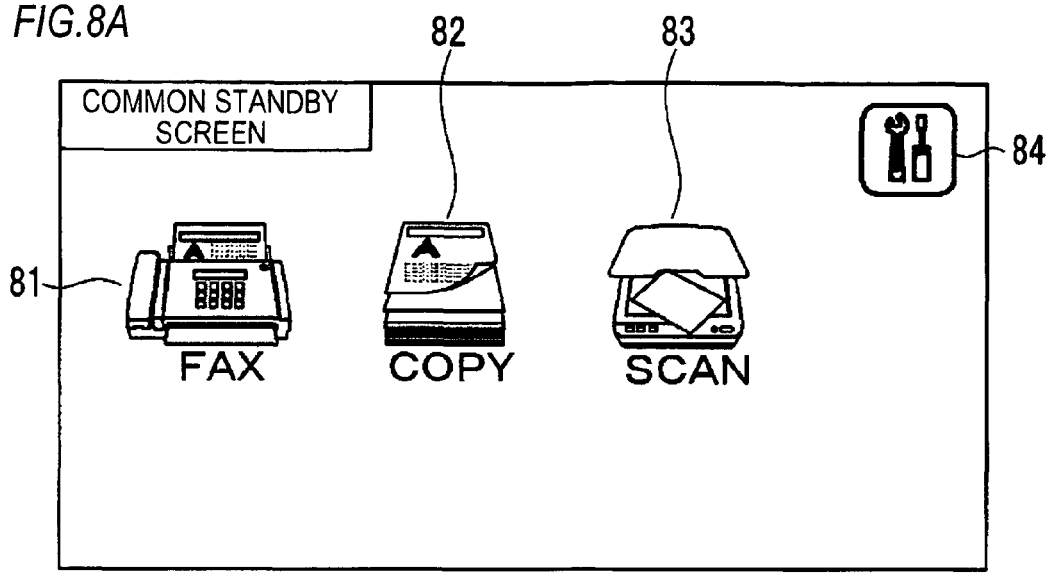

When a power supply of the complex machine 10 becomes on, for example, the control program 35 of the complex machine 10 displays the common standby screen on the display 23. This processing is an example of the display control processing. FIG. 8A depicts an example of the common standby screen defined by the common standby screen definition information. The common standby screen shown in FIG. 8A includes a [FAX] icon 81, a [COPY] icon 82, a [SCAN] icon 83, and a setting icon 84. The respective icons 81 to 84 included in the common standby screen are examples of the screen transition object for instructing transition of the screen.

The common standby screen is a screen that is to be displayed on the display 23 when a non-operation time period of the input device 24 reaches a first time period after a new screen is displayed on the display 23. The common standby screen may be a so-called top screen that is first to be displayed on the display 23 when the power supply of the complex machine 10 becomes on, for example. At this time, a so-called splash screen in which a logo of a vendor is displayed is not here considered. The common standby screen may be a so-called top screen that is to be displayed on the display 23 when the screen transition object for instructing transition to the top screen is selected. The common standby screen may be a so-called return screen that is to be displayed at a point of time that a sleep state is released.

The control program 35 stands by at a state where a user's operation of selecting each of the icons 81 to 84 can be received through the input device 24 (S11). When a user's operation of tapping a position of the [FAX] icon 81 is received through the input device 24 (S11: Yes), the control program 35 displays a FAX transmission screen on the display 23, instead of the common standby screen (S12). In other words, the control program 35 changes the screen displayed on the display 23 from the common standby screen to the FAX transmission screen. The processing of step S11 is an example of the first reception processing, and the processing of step S12 is an example the screen transition processing.

Figure 8B:
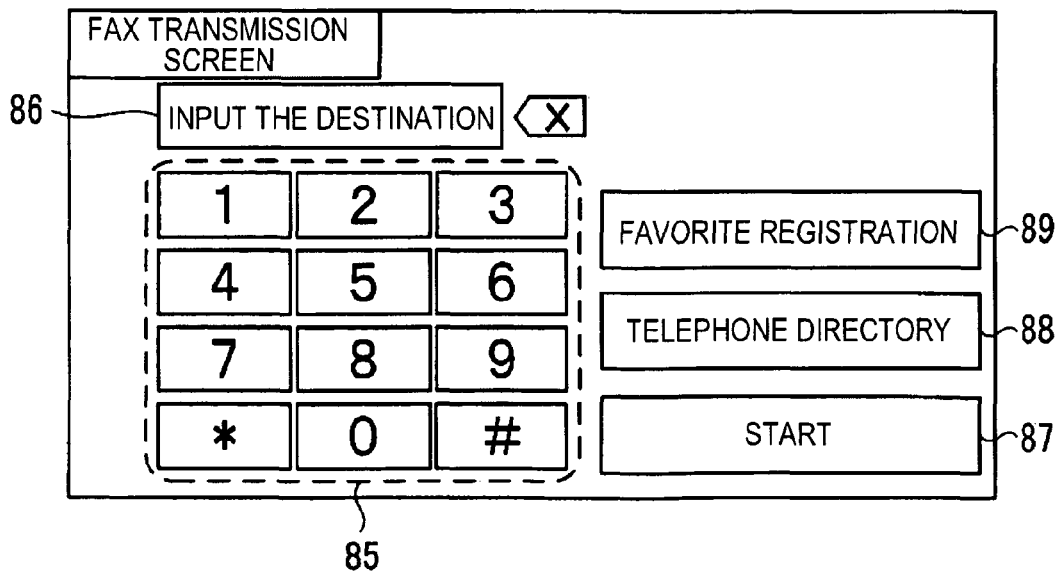

FIG. 8B depicts an example the FAX transmission screen defined by the FAX transmission screen definition information. The FAX transmission screen shown in FIG. 8B includes a ten key 85 for receiving an input of a FAX number, a text box 86 for displaying the FAX number received through the ten-key 85, a [START] icon 87 for instructing execution of FAX transmission processing using the FAX number displayed in the text box 86, a [Telephone Directory] icon 88 for instructing a call of the FAX number registered in a telephone directory, and a [Favorite Registration] icon 89 for instructing an association of the FAX number displayed in the text box 86 with a shortcut icon (which will be described later).

When a user's operation of tapping a position of the ten key 85 is received through the input device 24, the control program 35 displays a number of the tapped position in the text box 86, as a part of the FAX number. When a user's operation of tapping a position of the [START] icon 87 is received through the input device 24, the control program 35 enables the scanner unit 12 to read a document set on a contact glass or ADF (abbreviation of Auto Document Feeder), and enables the FAX unit 13 to FAX-transmit scan data generated by the scanner unit 12 to the FAX number displayed in the text box 86. After the FAX transmission processing is completed, the control program 35 again changes the screen displayed on the display 23 from the FAX transmission screen to the common standby screen.

The FAX transmission screen is associated with the [FAX] icon 81. The FAX transmission screen is an example of the transition destination screen for inputting the operation information for instructing the scanner unit 12 and the FAX unit 13 to execute the FAX transmission processing. That is, the operation of tapping the positions of the ten-key 85 and the operation of tapping the position of the [START] icon 87 are examples of the input of the operation information. Like this, the operation information includes the instruction (for example, selection of the [START] icon 87) for starting the operation of the image forming device, too, in addition to the information (for example, FAX number) necessary to operate the image forming device.

When a user's operation of tapping a position of [Telephone Directory] icon 88 is received through the input device 24, the control program 35 changes the screen displayed on the display 23 from the FAX transmission screen to a telephone directory screen for displaying FAX numbers registered already in the telephone directory in a list form, and receives a user's operation of selecting one of the listed FAX numbers through the input device 24. When a user's operation of tapping a position of the [Favorite Registration] icon 89 is received through the input device 24, the control program 35 associates the FAX number displayed in the text box 86 with a shortcut icon (which will be described later).

That is, the [Telephone Directory] icon 88 is an example of the screen transition object for instructing transition to the telephone directory screen. The telephone directory screen is an example of the transition destination screen for inputting the operation information indicative of a destination of the FAX transmission processing. That is, the screen transition object may be included in not only the common standby screen but also the transition destination screen. The transition destination screen is not limited to the screen that is to be changed when the screen transition object displayed in the common standby screen is selected, and may be a screen that has been further changed from the transition destination screen.

When a user's operation of tapping a position of the [COPY] icon 82 in the common standby screen is received through the input device 24 (S11: Yes), the control program 35 changes the screen displayed on the display 23 from the common standby screen to a copy screen for execution of copy processing (S12). The copy processing is processing of enabling the printer unit 11 to record an image, which is represented by the scan data generated by the scanner unit 12, onto a sheet. Then, the control program 35 again changes the screen displayed on the display 23 from the copy screen to the common standby screen after the copy processing is completed. The copy screen is an example of the transition destination screen for inputting the operation information such as selection of the number of sheets to be copied, selections of a sheet size and a sheet type, selection of color or monochrome copy and start of the copy processing, for example.

When a user's operation of tapping a position of the [SCAN] icon 83 in the common standby screen is received through the input device 24 (S11: Yes), the control program 35 changes the screen displayed on the display 23 from the common standby screen to a scan screen for enabling the scanner unit 12 to execute scan processing (S12). After the scan processing is completed, the control program 35 again changes the screen displayed on the display 23 from the scan screen to the common standby screen. The scan screen is an example of the transition destination screen for inputting the operation information such as designation of a resolution of the scan processing, selection of a preservation destination of scan data and start of the scan processing, for example.

When a user's operation of tapping a position of the setting icon 84 in the common standby screen is received through the input device 24 (S11: Yes), the control program 35 changes the screen displayed on the display 23 from the common standby screen to a detail setting screen for receiving a setting change of the complex machine 10 (S12). The detail setting screen is an example of the transition destination screen for inputting the operation information such as a size setting of a sheet to be used by the printer unit 11, a setting of a default value of a resolution of scan data to be generated by the scanner unit 12 and a setting of a preservation destination of FAX-received data, for example. Like this, the operation information that is to be input through the transition destination screen is not limited to the information for immediately operating the image forming device.

The control program 35 monitors with a timer whether an elapse time from the display of the common standby screen reaches a second time period (S13). When the second time period elapses while the input device 24 does not receive the user's operation (S11: No&S13: Yes), the control program 35 stops feeding the power to the display 23 (S14). The processing of step S14 is an example of the sleep processing. In the meantime, the timer monitoring of the second time period starts at a timing at which a screen except for the common standby screen is displayed on the display 23, too. The timer configured to measure the second time period is reset at a timing at which a screen displayed on the display 23 is switched.

When the power supply of the complex machine 10 becomes on, for example, the control program 35 makes the beacon receiver 26 stand by at a state where a beacon signal can be received. Here, it is assumed that the complex machine 10 is provided in a common space so that the users of the portable terminals 50A to 50C can use the same, for example. That is, it is assumed that the user carrying the portable terminal 50 can come close to the complex machine 10.

It is assumed that the portable terminal 50 repeatedly transmits a beacon signal having a predetermined output at a predetermined time interval. This processing is an example of the transmission processing. The beacon signal transmitted from the portable terminal 50 propagates in the air with gradually attenuating. That is, a radio field intensity of the beacon signal that is to be received at the beacon receiver 26 has a tendency that it becomes stronger as a distance between the complex machine 10 and the portable terminal 50 is shorter and it becomes weaker as the distance between the complex machine 10 and the portable terminal 50 is longer.

When the beacon signal transmitted from the portable terminal 50 is received through the beacon receiver 26, the control program 35 stores the beacon information in the data storage area 32B shown in FIG. 2 (S15). That is, the control program 35 stores, in the data storage area 32B, the beacon information including the terminal ID included in the received beacon signal, the timing information indicative of the receiving timing at which the beacon signal is received, and the intensity information indicative of a receiving intensity of the beacon signal.

Meanwhile, when the receiving intensity of the beacon signal is equal to or greater than a threshold (for example, 1.5 dBm), the control program 35 may store the beacon information of the beacon signal in the data storage area 32B in step S15. In other words, when the receiving intensity of the beacon signal is less than the threshold, the control program 35 may skip over step S15.

When the power supply of the complex machine 10 becomes on, for example, the control program 35 repeatedly executes repeating processing shown in FIG. 5C at a predetermined time interval. The predetermined time interval may be 10 msec to 1 sec, for example. In the meantime, the repeating processing may be executed when the beacon signal is received through the beacon receiver 26, in addition to the above timing or instead of the above timing.

First, the control program 35 determines whether the common standby screen is displayed on the display 23 (S16). When the common standby screen is being displayed (S16: Yes), the control program 35 executes standby screen switching processing (S17). On the other hand, when a screen rather than the standby screen, i.e., the transition destination screen is being displayed (S16: No), the control program 35 does not execute the standby screen switching processing. That is, the standby screen switching processing is processing that is to be executed only when the standby screen of the standby screen and the transition destination screen is being displayed. The standby screen switching processing is processing of switching the standby screen that is to be displayed on the display 23. The standby screen switching processing is described in detail with reference to FIG. 6.

First, the control program 35 determines whether the beacon information of which the receiving timing is within a monitoring time period is stored in the data storage area 32B shown in FIG. 3 (S21). The monitoring time period is a preset past time period from the present time to the past time. The monitoring time period may be 1 sec to 30 sec, for example. When the standby screen switching processing of step S17 is executed, the beacon information added in step S15 is stored. When the beacon information of which the receiving timing is within the monitoring time period is stored in the data storage area 32B (S21: Yes), the control program 35 determines whether the individual standby screen is displayed on the display 23 (S24). When the standby screen switching processing of step S17 is executed, the common standby screen is displayed on the display 23.

Then, the control program 35 extracts the terminal ID included in the beacon information, which includes the maximum radio field intensity, of the beacon information of which the receiving timing is within the monitoring time period (S26). The terminal ID extracted in step S26 is an example of the target identification information. In the example of FIG. 3, the terminal ID "001" having the radio field intensity of 4.0 dBm is extracted. Then, the control program 35 changes the screen displayed on the display 23 from the common standby screen to the individual standby screen associated with the terminal ID "001" (S27). The processing of step S27 is an example of the switching processing. The processing of steps S22, S23 and S25 is will be described later in step S34.

Figure 9A:
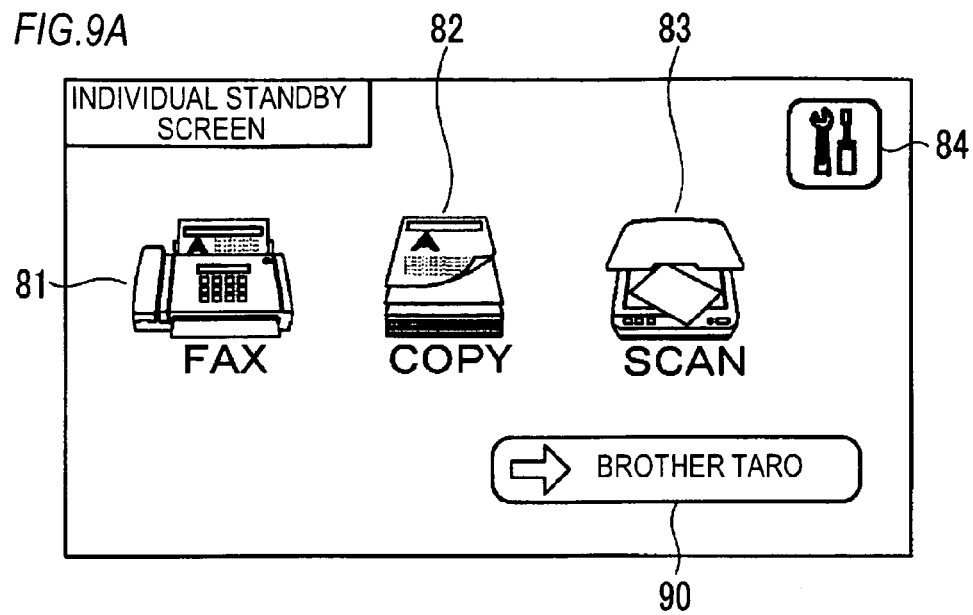

FIG. 9A depicts an example of the individual standby screen. The individual standby screen shown in FIG. 9A is defined by the first standby screen definition information corresponding to the terminal ID "001". The individual standby screen shown in FIG. 9A includes a shortcut icon 90, in addition to the icons 81 to 84 included in the common standby screen. The shortcut icon 90 is an example of the screen transition object for instructing transition to a destination display screen in which the destinations registered in the telephone directory are to be displayed.

The shortcut icon 90 may be included in the individual standby screen by logging in the complex machine 10 with the user ID allotted to the user of the portable terminal 50A and using the function of the [Favorite Registration] icon 89 in the FAX transmission screen. In this case, the terminal ID of the portable terminal 50 and the login ID of the user of the portable terminal 50 are associated with each other. The individual standby screen may be used instead of the common standby screen in the complex machine 10 logged in by the corresponding user ID.

The number of the shortcut icon included in the individual standby screen is not limited to one. The difference between the common standby screen and the individual standby screen is not limited to a configuration where the shortcut icon is provided or not. For example, the individual standby screen may not include an icon, which is included in the common standby screen, may include an icon, which is not included in the common standby screen, or may have a layout of the icons different from the common standby screen, in conformity to a taste of the corresponding user. The types and layout of icons, which are to be included in the individual standby screen, may be arbitrarily set by the user, for example.

Figure 7:
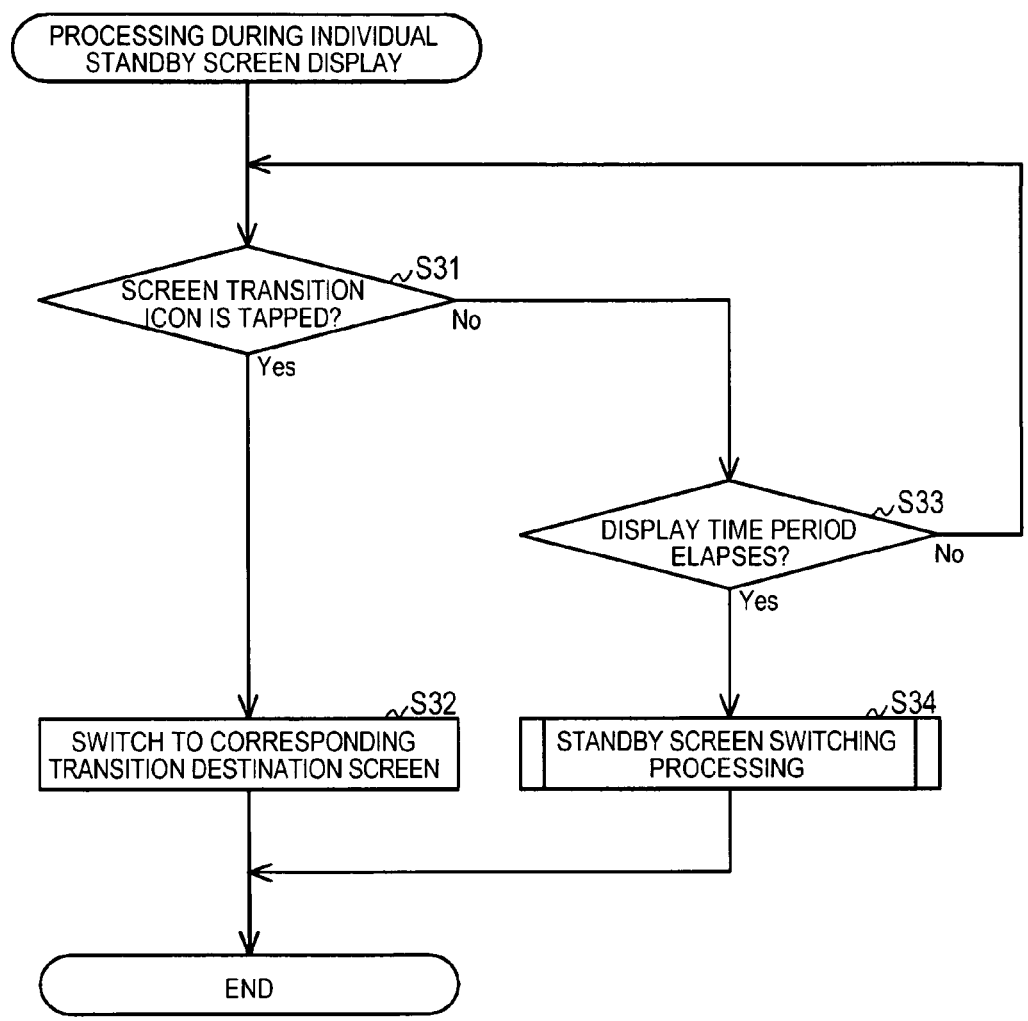
FIG. 7 is a flowchart of processing that is to be executed during an individual standby screen display.

Then, the control program 35 having displayed the individual standby screen on the display 23 executes processing shown in FIG. 7. That is, the control program 35 stands by at a state where a user's operation of selecting the icons 81 to 84, 90 included in the individual standby screen can be received through the input device 24 (S31). The processing of step S31 is another example of the first reception processing. The control program 35 monitors with the timer whether an elapse time from the display of the individual standby screen on the display 23 reaches a first time period (S33). In the meantime, the first time period is set to be shorter than the second time period. For example, the first time period is selected from a range of 1 min to 10 min, and the second time period is selected from a range of 3 min to 15 min so that it is longer than the first time period.

Figure 9B:
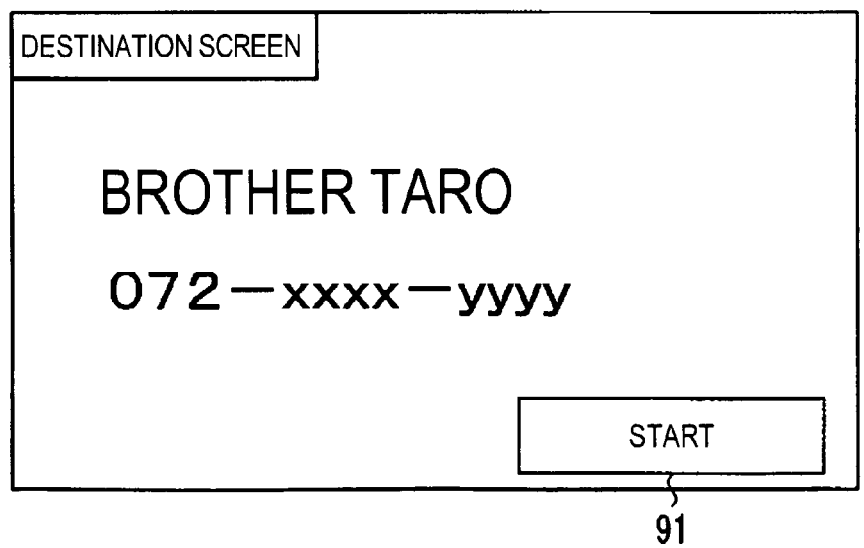

When a user's operation of tapping a position of the shortcut icon 90 is received through the input device 24 (S31: Yes), for example, the control program 35 changes the screen displayed on the display 23 from the individual standby screen to a destination screen (S32). FIG. 9B depicts an example of the destination screen. The destination screen shown in FIG. 9B includes a name of the destination "Brother Taro" and the FAX number "072-xxxx-yyyy" of the destination registered in the telephone directory, and a [START] icon 91.

When a user's operation of tapping a position of the [START] icon 91 is received through the input device 24, the control program 35 enables the FAX unit 13 to FAX-transmit the scan data generated by the scanner unit 12 to the displayed FAX number. That is, the destination screen is associated with the shortcut icon 90 and an example of the transition destination screen for inputting the operation information for instructing the scanner unit 12 and the FAX unit 13 to execute the FAX transmission processing. After the FAX transmission processing is completed, the control program 35 again changes the screen displayed on the display 23 from the destination screen to the individual standby screen.

When the first time period elapses without receiving the user's operation on the individual standby screen (S31: No&S33: Yes), the control program 35 executes the standby screen switching processing (S34). Here, the description of the standby screen switching processing shown in FIG. 6, which has been already described, is omitted, and the processing of steps S22, S23, S25 is described.

When the beacon information of which the receiving timing is within the monitoring time period is not stored in the data storage area 32B (S21: No), the control program 35 changes the screen displayed on the display 23 from the individual standby screen to the common standby screen (S22). The processing of step S22 is an example of the return processing. The control program 35 extends the second time period for which the timer monitoring starts upon the display of the individual standby screen (S23). That is, when the screen is switched to the common standby screen in step S22, the control program 35 extends the second time period without resetting the timer configured to monitor the second time period.

On the other hand, when the beacon information of which the receiving timing is within the monitoring time period is stored in the data storage area 32B and the individual standby screen is displayed on the display 23 (S21: Yes&S24: Yes), the control program 35 excludes the terminal ID "001" corresponding to the individual standby screen being displayed from the extraction target in step S25 (S25). Then, the control program 35, extracts the terminal ID from the beacon information, which does not include the terminal ID "001" (S26), and displays the individual standby screen corresponding to the terminal ID on the display 23 (S27).

In the example of FIG. 3, the terminal ID "002" having the radio field intensity of 3.2 dBm is extracted (S26), and the screen displayed on the display 23 is changed from the individual standby screen corresponding to the terminal ID "001" to the individual standby screen corresponding to the terminal ID "002" (S27). That is, when the input device 24 does not receive the user's operation after the individual standby screen corresponding to the terminal ID "001" is displayed until the first time period elapses, the control program 35 switches the screen to the individual standby screen corresponding to the terminal ID "002" different from the terminal ID "001".

In the meantime, the exclusion of the terminal ID "001" in step S25 may be released when the number of display times of the individual standby screen corresponding to another terminal ID reaches M (M: natural number of 1 or greater) times or greater, when the sleep processing is executed or when the beacon signal including the terminal ID "001" is received at a radio field intensity stronger than the maximum radio field intensity upon the exclusion.

Operational Effects of Illustrative Embodiment

According to the illustrative embodiment, when the user carrying the portable terminal 50 comes close to the complex machine 10 during the display of the standby screen, the standby screen is switched to the individual standby screen for the user of the portable terminal 50. Thereby, it is possible to provide an interface appropriate to the user who comes close to the complex machine 10 so as to use the same. In the meantime, even when the user carrying the portable terminal 50 comes close to the complex machine 10 during the display of the transition destination screen, the switching to the individual standby screen is not made. Thereby, it is possible to suppress the operation of the user who is operating the complex machine 10 from being disturbed.

In the meantime, when the users of the plurality of portable terminals 50A to 50C are close to the complex machine 10, it is preferably to switch the screen to the individual standby screen for the user closest to the complex machine 10, i.e., the user having the largest possibility that the user will use the complex machine 10. In the meantime, the extraction method of the terminal ID in step S26 is not limited to the above example.

For instance, the control program 35 may be configured to extract, as the target identification information, the terminal ID included in the beacon signal received most recently. That is, the control program 35 may be configured to extract, as the target identification information, the terminal ID included in the beacon signal in which the receiving timing is newest. In the example of FIG. 3, the terminal ID "003" is extracted.

As another example, when N or greater pieces (N: natural number of 2 or greater) of the beacon information of N including the same terminal ID is stored within the monitoring time period, the control program 35 may extract the terminal ID. For example, in case of N=2, the terminal IDs "001" and "002" are extracted in the example of FIG. 3. Thereby, when a user just passes by the vicinity of the complex machine 10, the screen is suppressed from being switched to the individual standby screen for the corresponding user.

As shown in FIG. 3, when a plurality of the terminal IDs "001", "002" is included in N or greater pieces of the beacon information, the control program 35 may extract, as the target identification information, the terminal ID included in the beacon information, which includes the maximum radio field intensity, of the beacon information including the extracted terminal ID. In the example of FIG. 3, comparing the maximum value of the radio field intensity of the beacon information including the terminal ID "001" and the maximum value of the radio field intensity of the beacon information including the terminal ID "002", the terminal ID "001" having the greater maximum value is extracted as the target identification information. In the meantime, comparing average values of the radio field intensities, the terminal ID "002" having the greater average value is extracted.

According to the illustrative embodiment, when the user's operation is not made after the individual display screen is displayed until the first time period elapses, the screen is switched to the individual standby screen for another user. Thereby, for example, when a user having no intention to use the complex machine 10 is close to the complex machine 10, it is possible to suppress the individual standby screen for the corresponding user from being continuously displayed.

When there is no user carrying the portable terminal 50 in the vicinity of the complex machine 10 at the timing at which the first time period elapses, the individual standby screen is switched to the common standby screen. As a result, it is possible to provide the complex machine 10 that can be easily used by a user who does not carry the portable terminal 50, too. Further, since the second time period is extended at the timing at which the first time period elapses, the sleep processing is suppressed from being executed just after the common standby screen is displayed. As a result, it is possible to suppress a user, who intends to operate the complex machine 10 through the common standby screen, from additionally executing an operation for releasing the sleep state.

In the meantime, the individual standby screen displayed on the display 23 may be operated by a user, rather than the corresponding user. Therefore, in the illustrative embodiment, the destination screen corresponding to the shortcut icon 90 is permitted to all users as regards the operation on the destination screen. Like this, the screen transition object included in the individual standby screen is preferably associated with the transition destination screen on which an input of the operation information is permitted to all the users. In other words, the screen transition object for transition to the transition destination screen on which an input of the operation information is specially permitted to a logged-in user is not preferably included in the individual standby screen.

First Modified Embodiment

Subsequently, operations of the image forming system 100 according to a first modified embodiment are described with reference to FIGS. 10 and 11. In the meantime, the descriptions of the common features to the above illustrative embodiment are omitted and the differences are mainly described. The image forming system 100 according to the first modified embodiment is configured to display a switching icon in the common standby screen without immediately switching the screen to the individual standby screen when the user carrying the portable terminal 50 comes close to the complex machine 10. When the switching icon is selected, the image forming system 100 according to the first modified embodiment changes the screen displayed on the display 23 from the common standby screen to the individual standby screen corresponding to the switching icon.

Figure 10A:
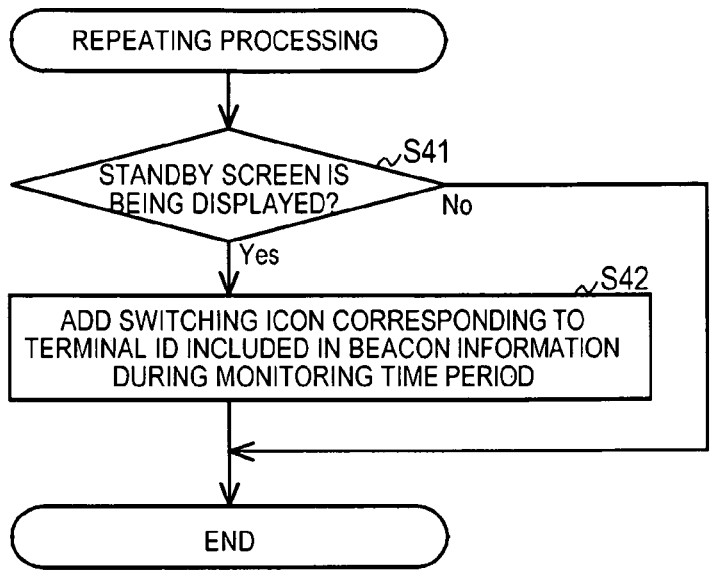
Figure 10B:
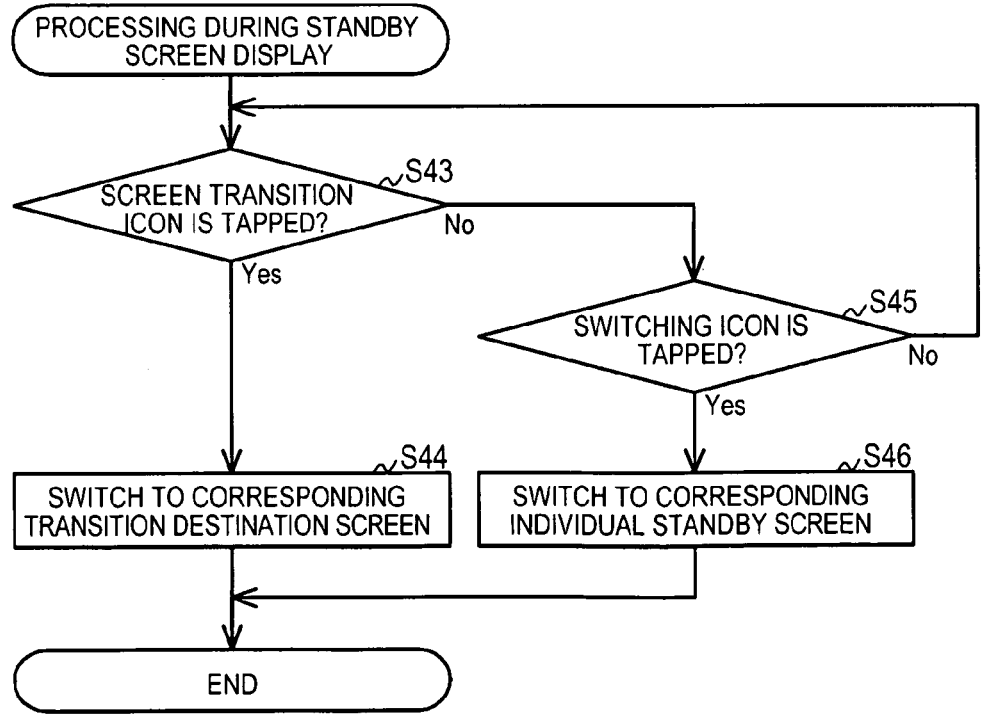

When the power supply of the complex machine 10 becomes on, for example, the control program 35 of the complex machine 10 repeatedly executes the repeating processing shown in FIG. 10A at a predetermined time interval. The predetermined time interval may be 10 msec to 1 sec, for example. That is, when the common standby screen is being displayed (S41: Yes), the control program 35 extracts the terminal ID included in the beacon information of which the receiving timing is within the monitoring time period, and adds the switching icon corresponding to the terminal ID to the common standby screen (S42). The processing of step S42 is an example of the object addition processing.

Figure 11A:
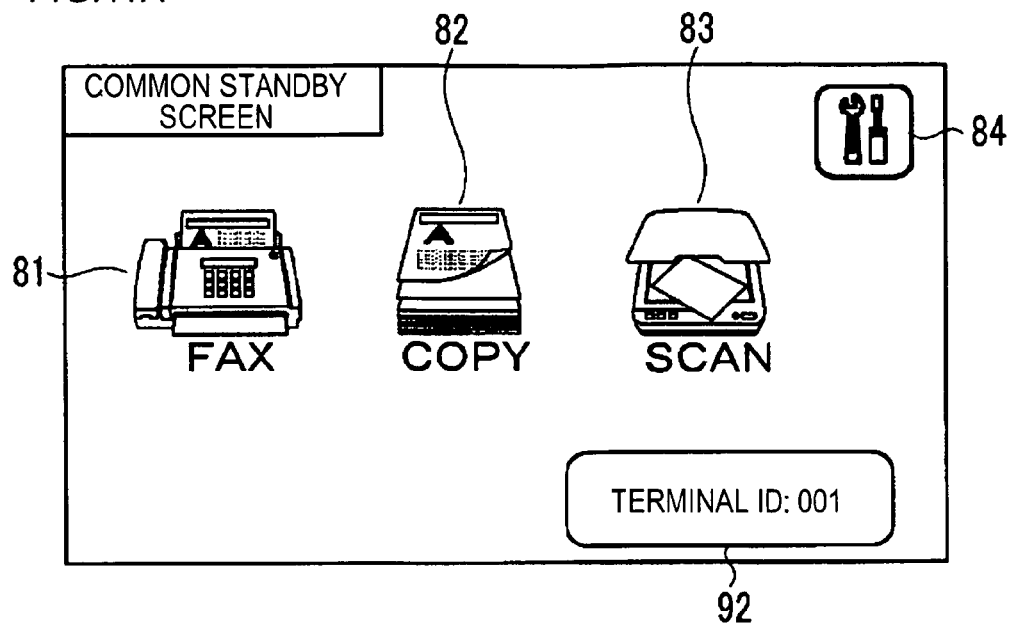
Figure 11B:
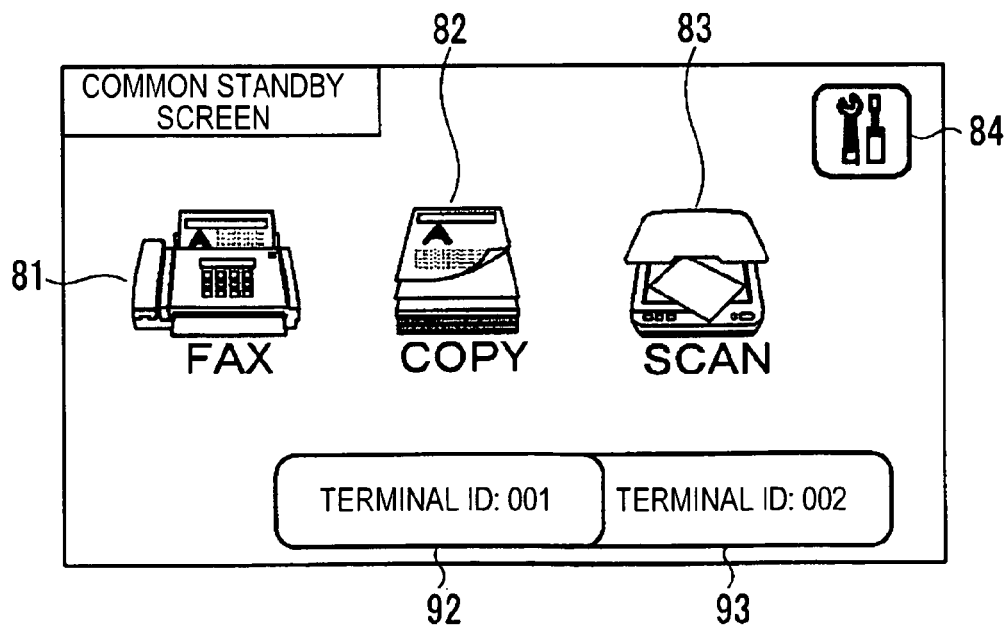

FIG. 11A depicts an example of the common standby screen including a switching icon 92. FIG. 11B depicts an example of the common standby screen including switching icons 92, 93. The switching icon 92 is an example of the screen transition object for instructing transition to the individual standby screen customized for the user of the terminal ID "001". The switching icon 93 is an example of the screen transition object for instructing transition to the individual standby screen customized for the user of the terminal ID "002".

That is, when only the terminal ID "001" is included in the beacon information of which the receiving timing is within the monitoring time period, the control program 35 displays the common standby screen shown in FIG. 11A on the display 23. In the meantime, when only the terminal IDs "001" and "002" are included in the beacon information of which the receiving timing is within the monitoring time period, the control program 35 displays the common standby screen shown in FIG. 11B on the display 23. In the meantime, the extraction condition of the terminal ID in step S42 is not limited to the above example. For example, the control program 35 may extract the terminal ID included in the beacon information of which the receiving timing is within the monitoring time period and the radio field intensity is equal to or greater than a threshold intensity.

Then, the control program 35 stands by at a state where the user's operation of selecting each of the icons 81 to 84 can be received through the input device 24 (S43). The control program 35 stands by at a state where the user's operation of selecting each of the switching icons 92, 93 can be received through the input device 24 (S45). The processing of step S45 is an example of the second reception processing.

Then, when the user's operation of tapping a position of each of the icons 81 to 84 included in the common standby screen is received through the input device 24 (S43: Yes), the control program 35 changes the screen displayed on the display 23 transition from the common standby screen to the transition destination screen corresponding to any of the icons 81 to 84 of the tapped position (S44). Since the processing of steps S43, S44 is common to the processing of steps S11, S12 shown in FIG. 5A, the detailed descriptions thereof are omitted.

In the meantime, when a user's operation of tapping a position of the switching icon 92 of the switching icons 92, 93 included in the common standby screen shown in FIG. 11B is received through the input device 24 (S45), the control program 35 changes the screen displayed on the display 23 from the common standby screen to the individual standby screen shown in FIG. 9A (S46).

According to the first modified embodiment, when a plurality of users is close to the complex machine 10, it is possible to simply switch the screen to the individual standby screen for a user who wants to use the complex machine 10. In the meantime, the switching icon may be added to not only the common standby screen but also the individual standby screen. That is, the processing shown in FIG. 10 may be executed during the display of the individual standby screen, too.

Second Modified Embodiment

Subsequently, operations of the image forming system 100 according to a second modified embodiment are described with reference to FIGS. 12 and 13. In the meantime, the descriptions of the common features to the above illustrative embodiment are omitted and the differences are mainly described. When the selection of the screen transition object by the user carrying the portable terminal 50 is received through the input device 24, the image forming system 100 of the second modified embodiment displays the transition destination screen associated with the selected screen transition object and customized for the user on the display 23.

Figures 12A, 12B:
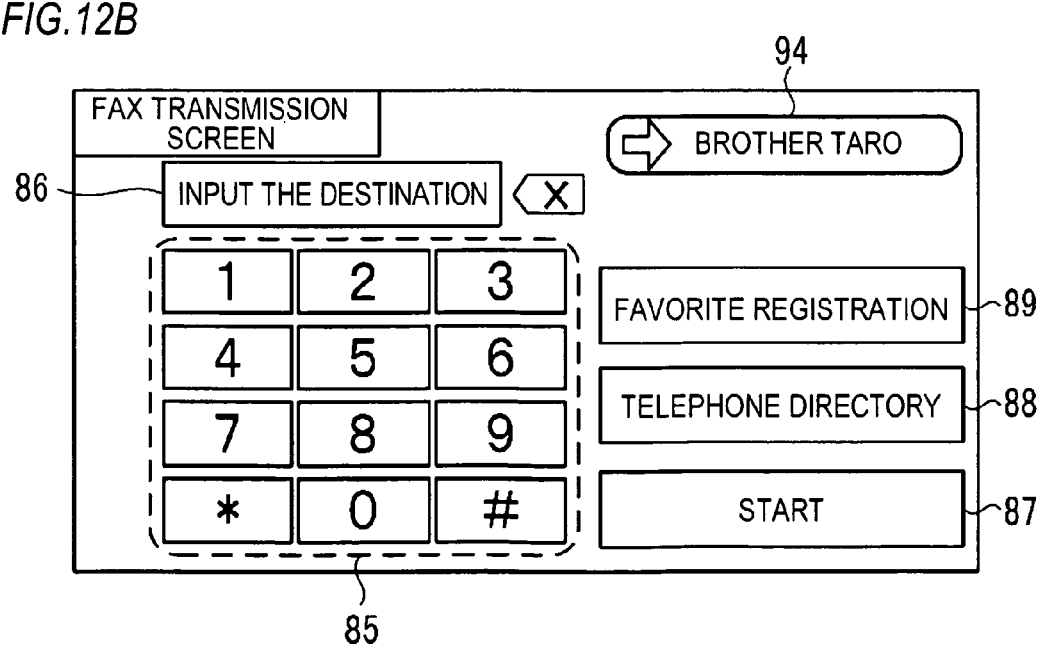
FIG. 12A depicts another example of the definition information stored in the data storage area 32B.
FIG. 12B depicts an example of a FAX transmission screen including a shortcut icon 94.

In the second modified embodiment, the data storage area 32B is configured to store therein the standby screen definition information, the common FAX transmission screen definition information, and the first to third FAX transmission screen definition information, instead of the definition information shown in FIG. 4, as shown in FIG. 12A. In the example of FIG. 12A, the standby screen definition information defining the common standby screen shown in FIG. 8A and the common FAX transmission screen definition information defining the FAX transmission screen shown in FIG. 8B are not associated with the terminal ID. That is, the screens that are to be defined by the corresponding definition information are screens that are to be commonly used for all users. In the meantime, the first to third FAX transmission screen definition information associated with the different terminal IDs defines the FAX transmission screens customized for corresponding users, respectively.

When the beacon signal transmitted from the portable terminal 50 is received through the beacon receiver 26, the control program 35 of the complex machine 10 executes the processing shown in FIG. 5B. When the common standby, screen shown in FIG. 8A is displayed on the display 23, the control program 35 executes the processing shown in FIG. 13. That is, the control program 35 stands by at a state where the user's operation of selecting each of the icons 81 to 84 can be received through the input device 24 (S51).

Then, when a user's operation of tapping the position of the [FAX] icon 81 is received through the input device 24 (S51: Yes), for example, the control program 35 determines whether the beacon information of which the receiving timing is within the monitoring time period is stored in the data storage area 32B shown in FIG. 3 (S52). In the meantime, the processing of step S52 and thereafter is also executed in the same manner when the other icons 82 to 83 included in the common standby screen are selected.

When the beacon information of which the receiving timing is within the monitoring time period is not stored (S52: No), the control program 35 changes the screen displayed on the display 23 from the common standby screen shown in FIG. 8A to the FAX transmission screen shown in FIG. 8B (S53). In the second modified embodiment, the FAX transmission screen shown in FIG. 8B is an example of the common transition destination screen. The processing of steps S52, S53, S54 and S55 is another example of the screen transition processing.

On the other hand, when the beacon information of which the receiving timing is within the monitoring time period is stored (S52: Yes), the control program 35 changes the screen displayed on the display 23 from the common standby screen shown in FIG. 8A to the FAX transmission screen shown in FIG. 12B (S54, S55). Specifically, the control program 35 extracts the terminal ID included in the beacon information, which includes the maximum radio field intensity, of the beacon information of which the receiving timing is within the monitoring time period, in step S54. Then, in step S55, the control program 35 displays the FAX transmission screen, which is defined by the definition information associated with the extracted terminal ID, of the FAX transmission screen associated with the [FAX] icon 81 on the display 23.

The FAX transmission screen shown in FIG. 12B is a screen defined by the first FAX transmission screen definition information associated with the terminal ID "001", for example. The FAX transmission screen shown in FIG. 12B is different from the FAX transmission screen shown in FIG. 8B, in that it includes a shortcut icon 94. The function of the shortcut icon 94 may be common to the shortcut icon 90 shown in FIG. 9, for example. That is, when a user's operation of selecting the shortcut icon 94 is received through the input device 24, the control program 35 changes the screen displayed on the display 24 from the FAX transmission screen shown in FIG. 12B to the destination screen shown in FIG. 9B. The FAX transmission screen shown in FIG. 12B is an example of the individual transition destination screen.

According to the second modified embodiment, for example, when the user carrying the portable terminal 50A selects the [FAX] icon 81, the FAX transmission screen shown in FIG. 12B is displayed. Thereby, the user of the portable terminal 50A can enable the FAX unit 13 to execute the FAX transmission processing through the FAX transmission screen customized for the user. On the other hand, when the [FAX] icon 81 is selected by a user who does not carry the portable terminal 50, the FAX transmission screen shown in FIG. 8B is displayed. That is, it is possible to provide the interface that can be easily by the user who does not carry the portable terminal 50, too.

In the complex machine 10 of the illustrative embodiment, the various programs stored in the program storage area 32A of the storage 32 are executed by the CPU 31, so that the respective processing to be executed by the controller of the disclosure is implemented. However, the configuration of the controller is not limited thereto and a part or all thereof may be implemented by the hardware such as an IC (abbreviation of Integrated Circuit).

The disclosure may be implemented as not only the complex machine 10 but also the program for enabling the complex machine 10 to execute the processing. The program may be provided with being recorded, in a non-transitory recording medium. The non-transitory may include a CD-ROM, a DVD-ROM, and a storage mounted on a server apparatus that can be connected to the complex machine 10 or the portable terminal 50 through the communication network. The program stored in the storage of the server apparatus may be delivered through the communication network such as the Internet, as the information or signals representing the program.

According to the above configuration, when a user carrying a portable terminal configured to transmit a beacon signal comes close to the image forming apparatus, if the standby screen is being displayed, the screen is switched to an individual standby screen for the user, and if the transition destination screen is being displayed, the display switching is not performed. As a result, it is possible to display the individual standby screen customized for a close user without disturbing other user's operation.

In the meantime, 'standby screen' may be a so-called top screen that is to be displayed when starting processing of the image forming apparatus is over or a so-called return screen that is to be displayed when a sleep state is released, for example. In the meantime, 'transition destination screen' may include a screen for setting execution conditions (sheet size, number of sheets to be printed, magnification percentage and the like) of print processing, a screen for setting execution conditions (resolution, number of colors, file format and the like) of scan processing, a telephone directory screen for selecting a FAX transmission destination, an execution instruction screen for instructing the print processing, the scan processing and the FAX transmission processing, and the like, for example.

According to the above configuration, when a user just passes by the vicinity of the image forming apparatus, the screen is suppressed from being switched to the individual standby screen for the corresponding user.

According to the above configuration, it is possible to switch the screen to an individual standby screen for a user closest to the image forming apparatus, i.e., a user having the largest possibility that the user will use the image forming apparatus.

According to the above configuration, for example, when a user having no intention to use the image forming apparatus is close to the image forming apparatus, it is possible to suppress the individual standby screen for the corresponding user from being continuously displayed.

According to the above configuration, it is possible to suppress the sleep processing from being executed just after a user who intends to use the image forming apparatus is detected. As a result, it is not necessary to make the user perform processing for releasing the sleep state.

Thereby, when a plurality of users is close to the image forming apparatus, it is possible to simply switch the screen to the individual standby screen for a user who wants to use the image forming apparatus.

According to the above configuration, when there is no user carrying the portable terminal in the vicinity of the image forming apparatus, the screen, is switched to the common standby screen. Therefore, it is possible to provide the image forming apparatus that can be easily used by a user who does not carry the portable terminal, too.

In the image forming apparatus having the above configurations, the individual standby screen displayed on the display may be operated by a user, not the corresponding user. For this reason, it is preferably not include a screen transition object for transition to a transition destination screen on which an input is permitted to a specific user, in the individual standby screen.

According to the disclosure, the screen can be switched to the individual standby screen during the display of the standby screen, and the display switching cannot be made during the display of the transition destination screen. Therefore, it is possible to display the individual standby screen customized for a close user without disturbing the other user's operation.

What is claimed is:
1. An image forming apparatus comprising:
an image forming device configured to form an image;
an input device;
a beacon receiver configured to receive a beacon signal transmitted from a portable terminal with a radio wave, the beacon signal including identification information for identifying the portable terminal;
a storage configured to store definition information for defining a common standby screen, an individual standby screen and a transition destination screen, the common standby screen including a screen transition object for instructing transition of a screen and being common to all users, the individual standby screen including a screen transition object for instructing transition of a screen and being associated with the identification information included in the beacon signal by the portable terminal, the individual standby screen being customized for a user of the portable terminal, and the transition destination screen being associated with the screen transition object and being configured to input operation information for instructing the image forming device to perform an operation;
a display configured to display screens defined by the definition information; and
a controller,
wherein the controller is configured to execute:
display control processing of displaying one of the common standby screen and the individual standby screen on the display when the input device is not operated for a first time period after the transition destination screen is displayed on the display;
storage control processing of, when the beacon receiver receives the beacon signal, storing beacon information in the storage, the beacon information including the identification information included in the beacon signal and timing information indicative of a receiving timing at which the beacon signal is received;
first reception processing of receiving a first user's operation of selecting the screen transition object included in the displayed one of the common standby screen and the individual standby screen through the input device;
screen transition processing of, when the first user's operation is received through the input device, changing a screen displayed on the display from the one of the common standby screen and the individual standby screen, which is displayed on the display in the display control processing, to, the transition destination screen associated with the screen transition object; and switching processing of changing the screen displayed on the display from the one of the common standby screen and the individual standby screen, which is displayed on the display in the display control processing, to the individual standby screen associated with target identification information only when the one of the common standby screen and the individual standby screen is displayed, the target identification information corresponding to the identification information included in the beacon information of which receiving timing is within a past monitoring time period from a present time to a predetermined past time.

2. The image forming apparatus according to claim 1, wherein the controller is configured to execute the switching processing by using, as the target identification information, the identification information included in 2 or more pieces of the beacon information among plural pieces of the beacon information of which the receiving timings are within the monitoring time period.

3. The image forming apparatus according to claim 1, wherein
in the storage control processing, the controller is configured to store, in the storage, the beacon information, which further includes intensity information indicative of a radio field intensity of the beacon signal, and
the controller is configured to execute the switching processing by using, as the target identification information, the identification information included in the beacon information of which the receiving timing is within the monitoring time period and the radio field intensity is highest.

4. The image forming apparatus according to claim 1, wherein when a user's operation is not received through the input device after a first standby screen, which is the individual standby screen associated with first identification information, is displayed until the first time period elapses, the controller executes the switching processing by using, as the target identification information, second identification information, which is different from the first identification information, of the identification information included in the beacon information of which the receiving timing is within the monitoring time period.

5. The image forming apparatus according to claim 4, wherein
when the user's operation is not received through the input device after the individual standby screen is displayed until a second time period elapses, the controller executes sleep processing of stopping power feeding to the display, and
the first time period is shorter than the second time period.

6. The image forming apparatus according to claim 5, wherein when the controller executes the switching processing by using the second identification information as the target identification information, the controller extends the second time period.

7. The image forming apparatus according to claim 1, wherein the controller is configured to execute:
object addition processing of adding, to the displayed one of the common standby screen and the individual standby screen, a switching object for instructing the display of the individual standby screen associated with the identification information included in the beacon information of which the receiving timing is within the monitoring time period;
second reception processing of receiving a second user's operation of selecting the switching object included in the displayed one of the common standby screen and the individual standby screen through the input device; and
the switching processing of changing the screen displayed on the display from the one of the common standby screen and the individual standby screen, which is displayed on the display in the display control processing, to the individual standby screen corresponding to the switching object on the display instead of the standby screen when the second user's operation is received through the input device.

8. The image forming apparatus according to claim 7, wherein
in the object addition processing, when plural pieces of the beacon information of which the receiving timing is within the monitoring time period respectively include plural pieces of the identification information which are different from each other, the controller is configured to add, to the displayed one of the common standby screen and the individual standby screen, a plurality of the switching objects for instructing the display of the individual standby screen respectively associated with the plural pieces of identification information.

9. The image forming apparatus according to claim 1, wherein when a user's operation is not received through the input device after the individual standby screen is displayed until a first time period elapses and the beacon information of which the receiving timing is within the monitoring time period is not stored in the storage, the controller executes return processing of displaying the common standby screen on the display.

10. The image forming apparatus according to claim 1, wherein the screen transition object included in the individual standby screen is associated with the transition destination screen on which an input of the operation information is permitted to all users.

11. The image forming apparatus according to claim 1, wherein the beacon receiver is configured to receive the beacon signal based on any one of Bluetooth LE, Bluetooth Smart and iBeacon.

12. An image forming apparatus comprising:
an image forming device configured to form an image;
an input device;
a beacon receiver configured to receive a beacon signal transmitted from a portable terminal with a radio wave, the beacon signal including identification information for identifying the portable terminal;
a storage configured to store definition information for defining a standby screen, a common transition destination screen and an individual transition destination screen, the standby screen including a screen transition object for instructing transition of a screen, the common transition destination screen being associated with the screen transition object, being configured to input operation information for instructing the image forming device to perform an operation and being common to all users, and the individual transition destination screen being associated with the screen transition object, being configured to input operation information for instructing the image forming device to perform the operation, being associated with the identification information included in the beacon signal received from the portable terminal and being customized for a user of the portable terminal;
a display configured to display screens defined by the definition information, and
a controller, wherein the controller is configured to execute:
display control processing of displaying the standby screen on the display when a non-operation time period of the input device reaches a first time period after one of the common transition destination screen and the individual transition destination screen is displayed on the display;
storage control processing of, when the beacon receiver receives the beacon signal, storing beacon information, the beacon information including the identification information included in the beacon signal and timing information indicative of a receiving timing at which the beacon signal is received, in the storage;
first reception processing of receiving a first user's operation of selecting the screen transition object included in the standby screen through the input device; and
screen transition processing of, when the first user's operation is received through the input device, displaying, on the display, the common transition destination screen on the display in a case in which the beacon information of which the receiving timing is within a past monitoring time period from a present time to a predetermined past time is not stored in the storage, and displaying, on the display, the individual transition destination screen associated with the identification information included in the beacon information in a case in which the beacon information of which the receiving timing is within the monitoring time period is stored in the storage.

13. The image forming apparatus according to claim 12, wherein the beacon receiver is configured to receive the beacon signal based on any one of Bluetooth LE, Bluetooth Smart and iBeacon.

14. A non-transitory computer readable recording medium storing a computer program configured to be executed by a computer comprising: an image forming device configured to form an image; an input device; a beacon receiver configured to receive a beacon signal transmitted from a portable terminal with a radio wave, the beacon signal including identification information for identifying the portable terminal; a storage configured to store definition information for defining a common standby screen, an individual standby screen and a transition destination screen, the common standby screen including a screen transition object for instructing transition of a screen and being common to all users, the individual standby screen including a screen transition object for instructing transition of a screen and being associated with the identification information included in the beacon signal by the portable terminal, the individual standby screen being customized for a user of the portable terminal, and the transition destination screen being associated with the screen transition object and being configured to input operation information for instructing the image forming device to perform an operation; a display configured to display screens defined by the definition information; and a second controller, wherein the computer program when executed by the computer causes the computer to execute:
display control processing of displaying one of the common standby screen and the individual standby screen on the display when the input device is not operated for a first time period after the transition destination screen is displayed on the display;
storage control processing of, when the beacon receiver receives the beacon signal, storing beacon information in the storage, the beacon information including the identification information included in the beacon signal and timing information indicative of a receiving timing at which the beacon signal is received;
first reception processing of receiving a first user's operation of selecting the screen transition object included in the displayed one of the common standby screen and the individual standby screen through the input device;
screen transition processing of, when the first user's operation is received through the input device, changing a screen displayed on the display from the one of the common standby screen and the individual standby screen, which is displayed on the display in the display control processing, to the transition destination screen associated with the screen transition object; and
switching processing of changing the screen displayed on the display from the one of the common standby screen and the individual standby screen, which is displayed on the display in the display control processing, to the individual standby screen associated with target identification information only when the one of the common standby screen and the individual standby screen is displayed, the target identification information corresponding to the identification information included in the beacon information of which receiving timing is within a past monitoring time period from a present time to a predetermined past time.

* * * * *